United States Patent
Kadono

(10) Patent No.: US 6,539,123 B2
(45) Date of Patent: *Mar. 25, 2003

(54) METHODS, APPARATUSES AND PROGRAM RECORDING MEDIA FOR IMAGE CODING AND IMAGE DECODING

(75) Inventor: Shinya Kadono, Kobeshi (JP)

(73) Assignee: Matsushita Electric Industrial Co., Ltd. (JP)

(*) Notice: Subject to any disclaimer, the term of this patent is extended or adjusted under 35 U.S.C. 154(b) by 50 days.

This patent is subject to a terminal disclaimer.

(21) Appl. No.: 09/779,500

(22) Filed: Feb. 9, 2001

(65) Prior Publication Data

US 2001/0007598 A1 Jul. 12, 2001

Related U.S. Application Data

(63) Continuation of application No. 09/561,343, filed on Apr. 28, 2000, now Pat. No. 6,263,116, which is a continuation of application No. 09/012,191, filed on Jan. 23, 1998, now Pat. No. 6,088,485.

(30) Foreign Application Priority Data

Jan. 24, 1997 (JP) ............................................. 9-011000
Dec. 26, 1997 (JP) ............................................. 9-360116

(51) Int. Cl.$^7$ .............................. G06K 9/36; G06K 9/48
(52) U.S. Cl. ........................ 382/243; 382/241; 382/242
(58) Field of Search ................................. 382/243, 241, 382/242, 232, 235–236, 238–239, 190, 199; 358/426.02, 426.04, 426.13, 426.14, 448

(56) References Cited

U.S. PATENT DOCUMENTS

| | | | |
|---|---|---|---|
| 5,065,439 A | 11/1991 | Takasaki et al. | 382/241 |
| 5,117,287 A | 5/1992 | Koike et al. | 358/133 |
| 5,455,680 A | 10/1995 | Shin | 358/426 |
| 5,500,684 A * | 3/1996 | Uya | 348/586 |
| 5,768,438 A | 6/1998 | Etoh | 382/251 |
| 5,799,109 A | 8/1998 | Chung et al. | 382/243 |
| 6,078,694 A * | 6/2000 | Takahashi et al. | 382/232 |
| 6,088,485 A * | 7/2000 | Kadono | 382/241 |
| 6,263,116 B1 * | 7/2001 | Kadono | 382/243 |

FOREIGN PATENT DOCUMENTS

| | | |
|---|---|---|
| EP | 0 720 373 A1 | 7/1996 |
| EP | 0 720 377 A2 | 7/1996 |
| EP | 0 721 287 A1 | 7/1996 |
| EP | 0 753 970 A2 | 1/1997 |
| EP | 0 720 377 A3 | 10/1997 |
| GB | 2 296 839 A | 7/1996 |
| JP | 8-116542 | 5/1996 |
| JP | 8-294119 | 11/1996 |

OTHER PUBLICATIONS

"Object–Oriented Analysis–Synthesis Coding of Moving Images"; Signal Processing: Image Communication, vol. 1, Jan. 1, 1989, pp. 117–138, H.G. Musmann et al.; XP000519208 *abstract; figures 3,4*.

"Object–Oriented Analysis–Synthesis Coding Based on Moving Two–Dimensional Objects"; Signal Processing: Image Communication, vol. 2, No. 4, Dec. 1, 1990, pp. 409–428, M. Hoetter; XP000234775 *abstract; figures 1,2*.

(List continued on next page.)

Primary Examiner—Andrew W. Johns
Assistant Examiner—Duy M. Dang
(74) Attorney, Agent, or Firm—Parkhurst & Wendel, L.L.P.

(57) ABSTRACT

An object of this invention is to provide a coding method and a coding apparatus for efficiently coding both a pixel value signal and a shape signal which are included in an image signal to be coded, wherein a prediction changing unit outputs a reference pixel value changing signal and a reference shape signal to a switching circuit which selects a reference pixel value signal and to a switching circuit which selects a reference shape signal, respectively, so as to control the switching circuit in a way that appropriate reference signals are to be selected.

2 Claims, 16 Drawing Sheets

OTHER PUBLICATIONS

"MPEG-4 Video Verification Model Version 1.0 (Report ISO/IEC JTC1/SC29/WG11 MPEG4/N1172)" International Organisation for Standardisation, Jan. 1996, pp. 1–49, XP002056540 *p. 3, paragraph 1—p. 10, paragraph 1; figures 2.11, 3.2.1*.

Electronic Copy of: ISO/IEC JTC1/SC29/WG11 N1902 "Coding of Audio–Visual Objects: Visual Committee Draft" (Nov. 21 1997).

* cited by examiner

Fig.2 (a)
Decoded shape signal (time t0)
Fig.2 (b)
Predicted shape signal (time t1)
Fig.2 (c)
Decoded shape signal (time t2)
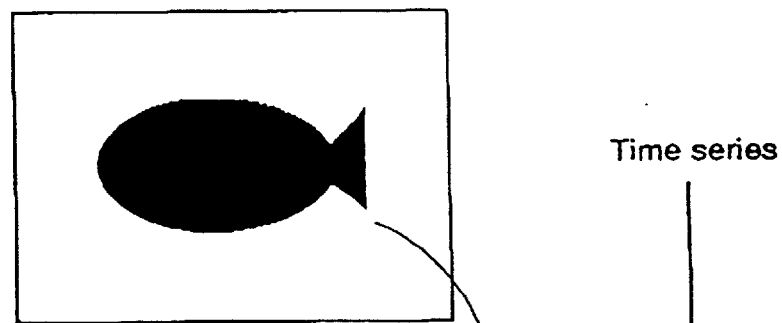
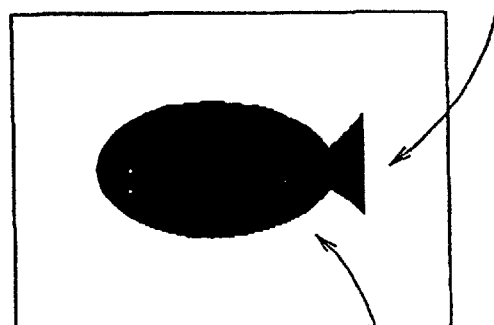
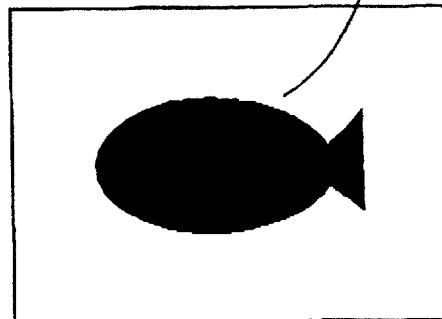

Fig.4 (a)

Shape signal coding

| Predetermined value reference | Forward reference | Backward reference |
|---|---|---|
| 0 | 10 | 11 |

Fig.4 (b)

Pixel value signal coding

| Predetermined value reference | Forward reference | Backward reference | Bidirectional reference |
|---|---|---|---|
| 00 | 01 | 10 | 11 |

Fig.5

Shape signal + pixel value signal coding

| Shape \ Pixel value | Predetermined value reference | Forward reference | Backward reference | Bidirectional reference |
|---|---|---|---|---|
| Predetermined value reference | 100 | 11100 | 11101 | 11110 |
| Forward reference | 1111100 | 00 | 1111101 | 101 |
| Backward reference | 1111110 | 1111111 | 01 | 110 |

Fig.6 (a)

Shape signal coding

| Predetermined value reference | Forward reference | Backward reference |
|---|---|---|
| 0 | 10 | 11 |

Fig.6 (b)

Pixel value signal coding

| Shape \ Pixel value | Predetermined value reference | Forward reference | Backward reference | Bidirectional reference |
|---|---|---|---|---|
| Predetermined value reference | 00 | 01 | 10 | 11 |
| Forward reference | 101 | 0 | 100 | 11 |
| Backward reference | 101 | 100 | 0 | 11 |

Pixel value signal

Decoded pixel value signal (time t0) — Pixel value signal to be coded (time t1) — Decoded pixel value signal (time t2)

Shape signal

Decoded shape signal (time t0) — Shape signal to be coded (time t1) — Decoded shape signal (time t2)

Pixel value signal

Shape signal

The whole

Foreground image (a specified object)

Background image (other than the specified object)

Pixel value signal

Shape signal

Prior Art
Fig.17 (a)
Input pixel value signal (time t0)
Fig.17 (b)
Input pixel value signal (time t1)
Fig.17 (c)
Input pixel value signal (time t2)
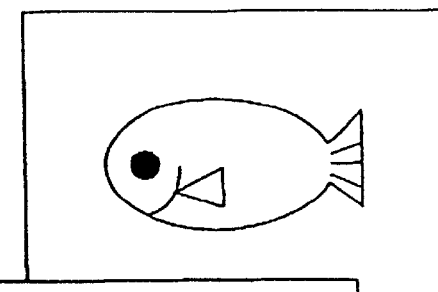
Time series

Prior Art
Fig.18 (a)
Decoded pixel value signal (time t0)
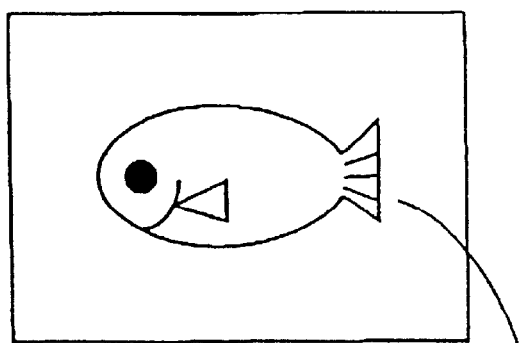
Time series
Fig.18 (b)
Predicted pixel value signal (time t1)
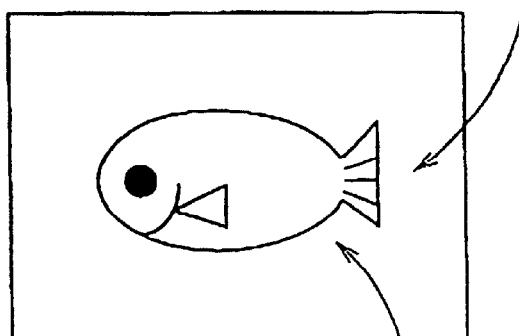
Fig.18 (c)
Decoded pixel value signal (time t2)
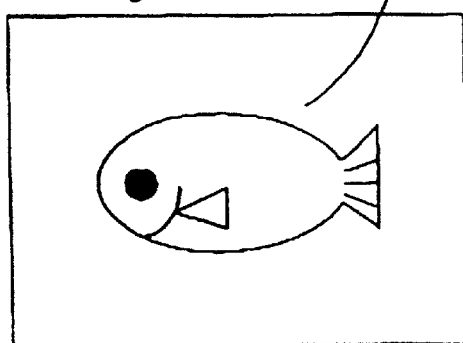

METHODS, APPARATUSES AND PROGRAM RECORDING MEDIA FOR IMAGE CODING AND IMAGE DECODING

This application in a continuation of application Ser. No. 09/561,343 filed Apr. 28, 2000, now U.S. Pat. No. 6,263,116, which is a continuation of application Ser. No. 09/012,191 filed Jan. 23, 1998, now U.S. Pat. No. 6,088,485.

FIELD OF THE INVENTION

This invention relates to an image coding/decoding method, an image coding/decoding apparatus and an image coding/decoding program recording medium, and particularly, to image coding with fewer bit number and without deteriorating the picture quality for recording and transmitting image signals having information on the shape of an object so as to process image signals for each object efficiently, and to image decoding for decoding the result of the image coding.

BACKGROUND OF THE INVENTION

The technology for digitizing images into digital image data is dramatically spreading and developing because digital data is easy to record, transmit, edit, copy and transfer. One of the advantages of digitization is the possibility of facilitating data compression. Compression coding is an important technology for data recording and data transmission. The compression coding technology has the established international standards, especially one of which is the MPEG standard that has spread as a general digital standard which can process both video and audio.

The compression coding of digital images processes image data comprising a series of digitized still pictures. In general, the compression coding has the two ways, one of which is an intra-frame coding which compresses a frame (corresponding to a picture) of still picture according to the spatial correlation (the correlation in a frame) while removing redundancy, and the other of which is a inter-frame coding which compresses frames of still pictures which are temporally close to each other, for example, temporally serial frames of pictures, according to the temporal correlation (the correlation among frames) while removing redundancy.

A prior art image coding based on MPEG and the like usually uses the intra-frame coding. If the inter-frame coding is carried out as well, the coded data has a high compression rate. To carry out the inter-frame coding, a decoding process which is a converse process of coding and motion detection and motion compensation processes are carried out to generate a predicted image and then a difference between an image to be coded and the predicted image is calculated using the predicted image as a reference image. Thus the decoding process, and the motion detection and motion compensation processes adversely increase the process load for an apparatus. However, the difference is small when the predicted image has preferable precision, it is possible to increase the coding efficiency by coding the difference more than by coding the image to be coded itself.

As the prediction method employed when the inter-frame coding are carried out, there are some methods, namely a forward prediction based on data which is located at a forward position on time series from the data of an image to be coded in a series of still pictures, a backward prediction based on data which is located at a backward position, and a bidirectional prediction based on data which are located at a forward and backward positions. In general, the intra-frame coding is represented as 'I', the forward predictive coding is represented as 'P', and the bidirectional predictive coding (including the backward predictive coding) is represented as 'B'.

When only the intra-frame coding is carried out, or when the forward predictive coding as well as the intra-frame coding are carried out, a series of still pictures to be coded can be processed simply according to time series. As opposed to this, when the backward or bidirectional prediction is carried out, the data which is located at a backward position on time series must be first coded. Therefore, in general, when the inter-frame coding is carried out as well, it is determined in advance which each frame constituting the image data to be coded, an I frame to be subjected to the intra-frame coding or a P frame which can be subjected to the forward predictive coding or a B frame which can be subjected to the bidirectional predictive coding. If the data to be processed is an I frame, the data is subjected to the intra-frame coding. If the data to be processed is a P frame or B frame, the data is subjected to the intra-frame coding or the inter-frame coding. When this coding process is carried out, it is possible to predetermine the ratio of the I frame and the P frame and the B frame according to the purpose of the result of the coding and to the like in the coding apparatus.

FIG. 14 is a diagram for explaining the intra- and inter-frame coding processes of the prior art. In the figure, numerals 1400 to 1406 each designate a frame of image data constituting an image data to be coded. Numerals t0 to t6 designate the respective times. The order of the times t0 to t6 indicates the course of time series. In the frames 1400 to 1406, the frame 1400 is a T frame, the frames 1403 and 1406 are P frames, and the frames 1401, 1402, 1404 and 1405 are B frames.

Arrows shown in the figure designate the reference relationships of each frame in the coding process. The frame 1400 which is an I frame is subjected to the intra-frame coding without referring to any other frame. The frame 1403 which is a P frame can be coded referring to the frame 1400 which is located at a forward position on time series. The frame 1401 which is a B frame can be coded referring to the frame 1400 which is located at a forward position on time series and/or the frame 1403 which is located at a backward position on time series.

For that reason, as described above, the frame 1403 must be coded earlier than the frames 1401 and 1402 which are located at a forward position in the frame 1403, and the I frame and the P frame are given priority to be coded earlier than the B frame. Further, no frames are coded referring to the B frame.

When the bidirectional predictive coding is additionally carried out for the coding process, the apparatus can decide whether the B frame is subjected to the inter-frame coding referring to a forward and backward frames, or the B frame is subjected to either a forward frame, a backward frame, or both frames which are selected as reference frames, or the intra-frame coding is an option as well.

As described above, the inter-frame coding, particularly when the bidirectional predictive coding is carried out as well, contributes to an increase in the process load and requires a storage means which has a large memory capacity for retaining temporally adjacent data. However, prediction with high-level precision makes a difference between a predicted image which is obtained by the prediction and an image to be coded small, whereby coding efficiency can be improved. Thus the coding method is determined according to the performance of an apparatus, the picture quality, the properties of coded data to be required and so on.

On the other hand, a method for coding image signals for each object has often been used in recent years. ISO standardizes these method as MPEG4. In November 1996, what is called the video verification model VM5.0 was worked out. The image signal for each object consists of pixel value signals which indicate brightness and color and are called texture and shape signals which represent the shape of the object. The image signal having this form is being utilized most in the computer graphics technology, and in the field where image sources are created such as the department of producing programs.

FIG. 15(a) to FIG. 15(c) are diagrams for explaining the coding for each object in the prior art. FIG. 16(a) and FIG. 16(b) are diagrams for explaining a signal processing for the coding of each object. FIG. 15(a) shows an example of objects to be coded, which is an image consisting of a background image and a foreground image (a goldfish swimming in a fish tank). FIG. 15(b) shows the foreground (the goldfish). FIG. 15(c) shows the background (water plants and water in the fish tank).

To composite the foreground image and the background image, information which is used for deciding which pixel constituting the composite image represents the foreground or the background, is required. For this reason, the foreground image shown in FIG. 15(b) consists of the pixel value signal shown in FIG. 16(a) and the shape signal (a binary alpha signal) shown in FIG. 16(b), the shape signal specifying the image representation. In this case, the pixel value signal indicates the texture of the goldfish and includes the brightness signal and color signal of each pixel. The shape signal indicates the profile of the goldfish, i.e. the contour of the goldfish, and is a two-valued signal having a value '1' inside the contour or a value '0' outside the contour. This shape signal indicates the foreground in the composition of the image. The shape signal shows that, in the figure, the region indicated by the black part has the value '1' and represents the foreground. In general, when the coding is carried out for each object, the pixel values signal and the shape signal are applied to specified objects while only the pixel value signal is applied to the parts other than the specified objects, whereby the coding efficiency is improved. As described above, in this case, the goldfish, i.e. the foreground image, is processed as a specified object.

The efficiency of coding the pixel value signal shown in FIG. 16(a) is improved because the pixel value signal shown in FIG. 16(a) is coded based on the above-mentioned temporal correlation referring to the signal which is obtained by decoding a pixel value signal which has been coded. There is another coding method which makes the coding efficiency more higher by adaptively changing two images for reference than by referring the pixel value signal of one image. The standards such as ISO MPEG1/2 and ITU-T H.261 provide the coding method which refers two images.

FIG. 17(a) to FIG. 17(c) and FIG. 18(a) to FIG. 18(c) are diagrams for explaining the coding of pixel value signals which refers a plurality of pictures. FIG. 17(a) to FIG. 17(c) show the pixel value signals of the input image which constitute the foreground image. FIG. 17(a) is taken at time t0. FIG. 17(b) is taken at time t1. FIG. 17(c) is taken at time t2. As shown in the figures, the three input pixel value signals are arranged in the same time series similarly to FIG. 14. A signal at time t0 is located at a forward position on time series from a signal at time t1. A signal at time t2 is located at a backward position on time series from a signal at time t1. The pixel value signal of the input image at time t1 shown in FIG. 17(b) has correlation with the pixel value signal at time t0 shown in FIG. 17(a) and the pixel value signal at time t2 shown in FIG. 17(c).

FIG. 18(a) and FIG. 18(c) shows decoded pixel value signals which are obtained by decoding the pixel value signals shown in FIG. 17(a) and FIG. 17(c) which have been coded. The predicted image at time t1 show in FIG. 18(b) is generated with good precision from the pixel value signals of the decoded images at time 0 and time 2 based on the correlation shown in FIG. 17(a) to FIG. 17(c).

The typical method of predicting images can generate a predicted image at time t1 by motion-compensating already decoded images at time t1and time t2 and averaging them. As there is a strong correlation between the predicted image at time t1 and the input image at time t1, the input image at time t1 is coded referring to the predicted image at time t1. That is, a difference image between the predicted image generated based on the forward and backward images on time series and the input image is calculated and then the pixel value signal of the difference image is coded.

Thus, when the image to be coded has strong correlation with the images located at a forward and backward positions on time series, it can be expected that the prediction has better precision by utilizing both the forward and backward images than by utilizing either of them. If the prediction has good precision, the pixel value signal of the difference image has a small amount of data, whereby the coding with high efficiency can be realized.

As described above, in the case of coding images for each object, the efficiency of coding the pixel value signal is realized based on the temporal correlation. On the other hand, the shape signal accompanying the pixel value signal is processed similarly to the pixel value signal, when only the intra-frame coding is carried out, or when the inter-frame coding accompanied with only the forward prediction is carried out. However, when the inter-frame coding accompanying with the bidirectional prediction is carried out, a problem arises whereby the efficiency of the coding of the shape signal decreases if the shape signal is processed in a similar way to that for the pixel value signal.

As the pixel value signal is a multivalued signal and includes a brightness signal and a color signal, the possibility of obtaining the preferable predicted image is strong because of the calculation of obtaining the average as described above. Therefore, the coding efficiency is improved if the temporally adjacent data are retained and are subjected to the calculation such as obtaining a difference or obtaining an average. As opposed to these, in the case of the two-valued shape signal as described above, for example, there is little merit even if an average is calculated referring to plural piece of reference information in order to obtain the preferable predicted image, because either of the two values must be used when the obtained average is neither of the two values. In general, for the two-valued shape signal, because the temporally adjacent data are retained and are subjected to the process such as obtaining an average, the precision of the prediction is not necessarily improved, but the utilization of the resource of the apparatus is prevented, or the coding efficiency is decreased.

In a prior art image coding, when the shape signal as well as the pixel value signal are similarly processed, a problem arises whereby the coding process with the bidirectional prediction decreases the process efficiency as described above. Thus, techniques for improving the efficiency of coding the pixel value signal are not simply applied to the coding of the shape signal. For that reason, in some cases the shape signal is processed by means of a method such as a reversible compression coding for two-valued signal which is used in a facsimile and the like, that is, the shape signal is recorded and transmitted apart from the pixel value signal in the prior art. However, a reversible method has generally less efficiency than an irreversible method, so the coding efficiency of the process efficiency would not be much improved.

SUMMARY OF THE INVENTION

It is an object of the present invention to provide an image coding method for coding the pixel value signal and the shape signal referring to the reference image, thereby improving the coding efficiency for both the pixel value signal and the shape signal.

It is another object of the present invention to provide an image coding apparatus for coding the pixel value signal and the shape signal referring to the reference image, thereby improving the coding efficiency for both the pixel value signal and the shape signal.

It is still another object of the present invention to provide an image decoding method for decoding the result of the coding which have been efficiently coded by the image coding method.

It is yet another object of the present invention to provide an image decoding apparatus for appropriately decoding the result of the coding which have been efficiently coded by the image coding apparatus.

It is a further object of the present invention to provide a recording medium for recording an image coding program of coding the pixel value signal and the shape signal referring to the reference image, thereby improving the coding efficiency for both the pixel value signal and the shape signal.

It is a still further object of the present invention to provide a recording medium for recording an image decoding program of appropriately decoding signals which have been efficiently coded by the image coding program.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

A conception that the shape signal is subjected to a prediction process adapting to the property of the shape signal by controlling the selection of a reference image used in the prediction process based on the temporal correlation independently of the pixel value signal, is utilized to obtain the objects.

According to a first aspect of the present invention, an image coding method for coding an input image signal including a shape signal indicating the shape of an object and a pixel value signal having information on the color and brightness of the object, comprising a pixel value signal coding step for coding the pixel value signal included in the input image signal referring to a decoded pixel value signal obtained by decoding a pixel value signal which has been already coded; a shape signal coding step for coding the shape signal included in the input image signal referring to a decoded shape signal obtained by decoding a shape signal which has been already coded; and a coding reference specification signal generating step for generating a reference pixel value specification signal for specifying the decoded pixel value signal to be referred in the pixel value signal coding step and a reference shape specification signal for specifying the decoded shape signal to be referred in the shape signal coding step, and then, based on the generated signals, generating a prediction selection signal having information indicating a reference method in a coding process, whereby the coding in the pixel value signal coding step and the shape signal coding step is carried out referring to the respectively selected reference signal.

According to a second aspect of the present invention, the image coding method of the first aspect wherein the shape signal coding step, a forward time decoded shape signal which is obtained from a shape signal which is located at a forward position on time series from a shape signal to be coded, and a backward time decoded shape signal which is obtained from a shape signal which is located at a backward position on time series from the shape signal to be coded, are used to be referred as the decoded shape signal, whereby a shape signal is coded using a correlation between the shape signal and its temporally adjacent signals.

According to a third aspect of the present invention, the image coding method of the second aspect wherein the pixel value signal coding step, a forward time decoded pixel value signal which is obtained from a pixel value signal which is located at a forward position on time series from a pixel value signal to be coded, and a backward time decoded pixel value signal which is obtained from a pixel value signal which is located at a backward position on time series from the pixel value signal to be coded, are used to be referred as the decoded pixel value signal, whereby the a shape signal and a pixel value signal are coded using a correlation between the signals and their temporally adjacent signals.

According to a fourth aspect of the present invention, the image coding method of the first aspect wherein the coding reference specification signal generating step, when the prediction selection signal is generated, the reference pixel value specification signal and the reference signal specification signal are integrated and coded, whereby the prediction selection signal is generated by assigning a short code length to a frequent phenomenon.

According to a fifth aspect of the present invention, the image coding method of the first aspect wherein in the coding reference specification signal generating step, when the prediction selection signal is generated, a method for indicting the specification of a decoded pixel value signal to be referred is determined corresponding to a method for indicating the specification of a decoded shape signal, whereby the prediction selection signal is generated by assigning a short code length to a frequent phenomenon.

According to a sixth aspect of the present invention, the image coding method of the first aspect wherein in the coding reference specification signal generating step, the reference decoded pixel value signal is specified for each pixel value changing unit which is a unit of the input pixel value signal, and the reference decoded shape signal is specified for each shape changing unit which is a unit of the input shape signal, whereby the coding process is carried out according to the property of the shape signal while reducing the changing frequency without any serious reduction in prediction precision.

According to a seventh aspect of the present invention, the image coding method of the sixth aspect wherein the shape changing unit is a frame constituting the input shape signal, whereby the coding process is carried out by means of the changing for each frame unit according to the property of the shape signal while reducing the changing frequency without any serious reduction in prediction precision.

According to an eight aspect of the present invention, the image coding method of the sixth aspect wherein the changing unit is a hierarchical unit containing a large block unit constituting the input shape signal and a small block unit constituting the large block, whereby the coding process is carried out by means of the changing for each hierarchical unit according to the property of the shape signal while reducing the changing frequency without any serious reduction in prediction precision.

According to a ninth aspect of the present invention, the image coding method of the first aspect wherein the shape signal coding step includes a comparison judgment step wherein among a forward time decoded shape signal which is obtained from a shape signal which is located at a forward position on time series from a shape signal to be coded and a backward time decoded shape signal which is obtained from a shape signal which is located at a backward position on time series from the shape signal to be coded, the decoded shape signal more adjacent to the shape signal to be coded is selected, and the decoded shape signal selected in the comparison judgment step is referred, whereby the reference process in the shape signal coding process is much simplified according to the property of the shape signal without any serious reduction in prediction precision.

According to a tenth aspect of the present invention, the image coding method of the first aspect wherein in the shape signal coding step, a forward time decoded shape signal which is obtained from a shape signal which is located at a forward position on time series from a shape signal to be coded is referred, whereby the reference process in the shape signal coding process is much simplified according to the property of the shape signal without any serious reduction in prediction precision.

According to the eleventh aspect of the present invention, the image coding method of the first aspect wherein the shape signal coding step includes a comparison judgment step wherein among a forward time decoded shape signal which is obtained from a shape signal which is located at a forward position on time series from a shape signal to be coded and a backward time decoded shape signal which is obtained from a shape signal which is located at a backward position on time series from the shape signal to be coded, the decoded shape signal more adjacent to the shape signal to be coded is selected, and includes a forward fixed step wherein the forward time decoded shape signal is selected, and the decoded shape signal selected in the comparison judgment step or the forward fixed step is referred, whereby the reference process in the shape signal coding process is much simplified by means of the changing according to the property of the shape signal without any serious reduction in prediction precision.

According to a twelfth aspect of the present invention, an image decoding method which decodes a coded shape signal and a coded pixel value signal which are obtained by coding a shape signal which is included in an image signal and indicates the shape of an object and a pixel value signal which is included in the image signal and has information on the color and brightness of the object, comprising a decoding reference specification signal generating step for generating a reference pixel value specification signal which specifies a decoded pixel value signal to be referred in decoding the coded pixel value signal, and a reference shape specification signal which specifies a decoded shape signal to be referred in decoding the coded shape signal, based on information obtained from a prediction selection signal including information indicating a reference method in a coding process, using the prediction selection signal; a pixel value signal decoding step for decoding the coded pixel value signal referring to a decoded pixel value signal specified based on the reference pixel value specification signal generated by the decoding reference specification signal generating step; and a shape signal decoding step for decoding the coded shape signal referring to a decoded shape signal specified based on the reference shape specification signal generated by the decoding reference specification signal generating step, whereby in the pixel value signal decoding step and in the shape signal decoding step the decoding is carried out using a reference appropriate for each step.

According to a thirteenth aspect of the present invention, the image decoding method of the twelfth aspect wherein in the shape signal decoding step, a forward time decoded shape signal obtained from a shape signal which is located at a forward position on time series from the coded shape signal to be decoded and a backward time decoded shape signal obtained from a shape signal which is located at a backward position on time series from the coded shape signal to be decoded are used as the decoded shape signal to be referred, whereby the coded shape signal is decoded referring to its temporally adjacent signal.

According to a fourteenth aspect of the present invention, the image decoding method of the thirteenth aspect wherein in the pixel value signal decoding step, a forward time decoded pixel value signal obtained from a pixel value signal which is located at a forward position on time series from the coded pixel value signal to be decoded and a backward time decoded pixel value signal obtained from a pixel value signal which is located at a backward position on time series from the coded pixel value signal to be decoded are used as the decoded pixel value signal to be referred, whereby the coded pixel value signal and the coded pixel value signal are decoded referring to their temporally adjacent signals.

According to a fifteenth aspect of the present invention, the image decoding method of the twelfth aspect wherein in the decoding reference specification signal generating step, the reference pixel value specification signal and the reference shape specification signal which have been integrated and coded are obtained by decoding the prediction selection signal, whereby the prediction selection signal which has been coded by assigning a short code length to a frequent phenomenon is decoded.

According to a sixteenth aspect of the present invention, the image decoding method of the twelfth aspect wherein in the decoding reference specification signal generating step, a method for indicating the specification of the decoded pixel value signal to be referred is determined in a decoding process of the prediction selection signal according to the method for indicating the specification of the decoded shape signal to be referred, whereby the prediction selection which has been coded by assigning a short code length to a frequent phenomenon is decoded.

According to a seventeenth aspect of the present invention, the image decoding method of the twelfth aspect wherein in the decoding reference specification signal generating step, the reference decoded pixel value signal is specified for each pixel value changing unit which is a unit of the coded pixel value signal and the reference decoded shape signal is specified for each shape changing unit which is a unit of the coded shape signal, whereby the coded shape signal which has been coded with the less frequent changing is decoded.

According to an eighteenth aspect of the present invention, the image decoding method of the sixteenth aspect wherein the shape changing unit is a frame constituting the coded shape signal, whereby the coded shape signal which has been coded with the less frequent changing is decoded by carrying out the changing for each frame.

According to a nineteenth aspect of the present invention, the image decoding method of the sixteenth aspect wherein the changing unit is a hierarchical unit containing a large block unit constituting the input shape signal and a small block unit constituting the large block, whereby the coded shape signal which has been coded with the less frequent changing is carried out by means of the changing for each hierarchical unit.

According to a twentieth aspect of the present invention, the image decoding method of the twelfth aspect wherein the shape signal decoding step includes a comparison judgment step wherein among a forward time decoded shape signal which is obtained from a shape signal which is located at a forward position on time series from the coded shape signal to be decoded and a backward time decoded shape signal which is obtained from a shape signal which is located at a backward position on time series from the coded shape signal to be decoded, the decoded shape signal more adjacent to the coded shape signal to be decoded is selected, and the decoded shape signal selected in the comparison judgment step is referred, whereby the coded shape signal which has been subjected to the coding process in which the reference process is simplified is decoded.

According to a twenty-first aspect of the present invention, the image decoding method of the twelfth aspect wherein in the shape signal decoding step, a forward time decoded shape signal which is obtained from a shape signal which is located at a forward position on time series from the coded shape signal to be decoded is referred, whereby the coded shape signal which has been subjected to the coding process in which the reference process is simplified is decoded.

According to a twenty-second aspect of the present invention, the image decoding method of the twelfth aspect wherein the shape signal decoding step includes a comparison judgment step wherein among a forward time decoded shape signal which is obtained from a shape signal which is located at a forward position on time series from the coded shape signal to be decoded and a backward time decoded shape signal which is obtained from a shape signal which is located at a backward position on time series from the coded shape signal to be decoded, the decoded shape signal more adjacent to the coded shape signal to be decoded is selected, and includes a forward fixed step wherein the forward time decoded shape signal is selected, and the decoded shape signal selected in the comparison judgment step or the forward fixed step is referred, whereby the coded shape signal which has been subjected to the coding process in which the reference process is simplified is decoded.

According to a twenty-third aspect of the present invention, an image coding apparatus for coding an input image signal including a shape signal indicating the shape of an object and a pixel value signal having information on the color and brightness of the object, comprising a pixel value signal coding means for coding the pixel value signal included in the input image signal referring to a decoded pixel value signal obtained by decoding a pixel value signal which has been already coded; a shape signal coding means for coding the shape signal included in the input image signal referring to a decoded shape signal obtained by decoding a shape signal which has been already coded; and a coding reference specification signal generating means for generating a reference pixel value specification signal for specifying the decoded pixel value signal to be referred in the pixel value signal coding step and a reference shape specification signal for specifying the decoded shape signal to be referred in the shape signal coding step and then, based on the generated signals, generating a prediction selection signal having information indicating a reference method in a coding process, whereby the coding in the pixel value signal coding step and the shape signal coding step is carried out referring to the respectively selected reference signal.

According to a twenty-fourth aspect of the present invention, an image decoding apparatus which decodes a coded shape signal and a coded pixel value signal which are obtained by coding a shape signal which is included in an image signal and indicates the shape of an object and a pixel value signal which is included in the image signal and has information on the color and brightness of the object, comprising a decoding reference specification signal generating means for generating a reference pixel value specification signal which specifies a decoded pixel value signal to be referred in decoding the coded pixel value signal and a reference shape specification signal which specifies a decoded shape signal to be referred in decoding the coded shape signal, based on information obtained from a prediction selection signal including information indicating a reference method in a coding process, using the prediction selection signal; a pixel value signal decoding means for decoding the coded pixel value signal referring to a decoded pixel value signal specified based on the reference pixel value specification signal generated by the decoding reference specification signal generating step, and a shape signal decoding means for decoding the coded shape signal referring to a decoded shape signal specified based on the reference shape specification signal generated by the decoding reference specification signal generating step, whereby in the pixel value signal decoding step and in the shape signal decoding step the decoding is carried out using a reference appropriate for each step.

According to a twenty-fifth aspect of the present invention, an image coding program recording medium for recording an image coding program for coding an input image signal including a shape signal indicating the shape of an object and a pixel value signal having information on the color and brightness of the object, the program comprising a pixel value signal coding step for coding the pixel value signal included in the input image signal referring to a decoded pixel value signal obtained by decoding a pixel value signal which has been already coded; a shape signal coding step for coding the shape signal included in the input image signal referring to a decoded shape signal obtained by decoding a shape signal which has been already coded; and a coding reference specification signal generating step for generating a reference pixel value specification signal for specifying the decoded pixel value signal to be referred in the pixel value signal coding step and a reference shape specification signal for specifying the decoded shape signal to be referred in the shape signal coding step, and then, based on the generated signals, generating a prediction selection signal having information indicating a reference method in a coding process, whereby the coding in the pixel value signal coding step and the shape signal coding step is carried out referring to the respectively selected reference signal by executing the image coding program on a computer system and the like.

According to a twenty-sixth aspect of the present invention, an image decoding program recording medium for recording an image decoding program which decodes a coded shape signal and a coded pixel value signal which are obtained by coding a shape signal which is included in an image signal and indicates the shape of an object and a pixel value signal which is included in the image signal and has information on the color and brightness of the object, the program comprising a decoding reference specification signal generating step for generating a reference pixel value specification signal which specifies a decoded pixel value signal to be referred in decoding the coded pixel value signal and a reference shape specification signal which specifies a decoded shape signal to be referred in decoding the coded shape signal, based on information obtained from a prediction selection signal including information indicting a reference method in a coding process, using the prediction selection signal; a pixel value signal decoding step for decoding the coded pixel value signal referring to a decoded pixel value signal specified based on the reference pixel value specification signal generated by the decoding reference specification signal generating step; and a shape signal decoding step for decoding the coded shape signal referring to a decoded shape signal specified based on the reference shape specification signal generated by the decoding reference specification signal generating step, whereby in the pixel value signal decoding step and in the shape signal decoding step the decoding is carried out using a reference appropriate for each step by executing the image decoding program on a computer system and the like.

BRIEF DESCRIPTION OF THE DRAWINGS

FIGS. 2 (a) to (c) are diagrams for explaining a shape signal coding process according to the first embodiment.

FIG. 4 (a) and FIG. 4 (b) are tables for explaining the code assignment of a prediction selection signal generating process according to a third embodiment of the present invention.

FIG. 5 is a table for explaining the code assignment of a prediction selection signal generating process according to a fourth embodiment of the present invention.

FIG. 6 (a) and FIG. 6 (b) are tables for explaining the code assignment of a prediction selection signal generating process according to a fifth embodiment of the present invention.

FIG. 7 (a) and FIG. 7(b) are diagrams for explaining the changing unit of a coding process according to a ninth embodiment.

FIG. 17 (a) to FIG. 17 (c) are diagrams for explaining the temporal relationship of pixel value signals in an image coding process carried out for each object in a prior art.

FIG. 18 (a) to FIG. 18 (c) are diagrams for explaining an image coding process carried out for each object based on the temporal relationship of pixel value in a prior art.

DETAILED DESCRIPTION OF THE PREFERRED EMBODIMENTS

Embodiment 1

The object of an image coding method and image coding apparatus according to a first embodiment of the present invention is to improve coding efficiency by changing the respective reference signals for a pixel value signal and shape signal.

Figure 1:
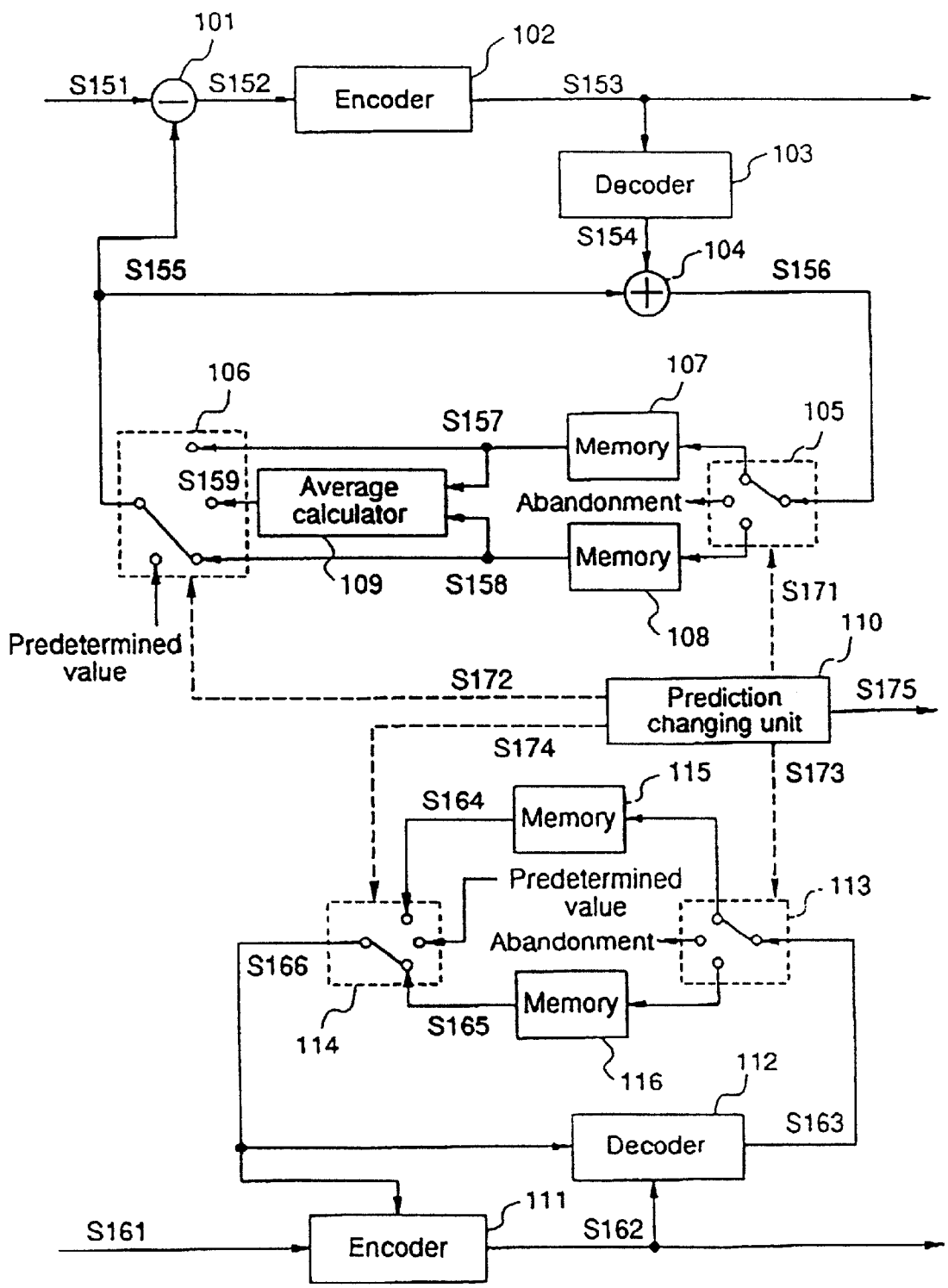
FIG. 1 is a block diagram showing the configuration of an image coding apparatus according to a first embodiment of the present invention.

FIG. 1 is a block diagram showing the configuration of the image coding apparatus according to the first embodiment. As shown in the figure, the image coding apparatus according to the first embodiment comprises a subtracter 101, an encoder (for pixel value signals 102, a decoder (for pixel value signals) 103, an adder 104, a first switching circuit 105, and a second switching circuit 106, a memory (a first memory for retaining decoded pixel value signals) 107, a memory (a second memory for retaining decoded pixel value signals) 108, an average calculator 109, a prediction changing unit 110, an encoder (for shape signals) 111, a decoder (for shape signals) 112, a third switching circuit 113, a fourth switching circuit 114, a memory (a first memory for retaining decoded shape signals) 115, and a memory (a second memory for retaining decoded shape signals) 116.

In the figure, the subtracter 101 calculates a difference between an input pixel value signal S151 which is the input into the image coding apparatus and a reference pixel value signal S155 which is output from the second switching circuit 106 described hereinafter, to generate a difference pixel value signal S152. The encoder (for pixel value signals) 102 subjects the difference pixel value signal S152 to a compression coding to generate a coded pixel value signal S153. The decoder (for pixel value signals) 103 subjects the coded pixel value signal S153 to a decoding process which is the converse process of the coding process to generate a coded and then decoded pixel value signal S154. The adder 104 adds the coded and then decoded pixel value signal S154 to a reference pixel value signal S155, which is output by the second switching circuit 106, to generate a decoded pixel value signal S156.

The first switching circuit 105 switches the output destinations for the decoded pixel value signal S156 according to a decoding pixel value changing signal S171 input from the prediction changing unit 110. The switching of the first switching circuit 105 decides either that the decoded pixel value signal S156 is input and stored in the memory 107 or the memory 108, or that the decoded pixel value signal S156 is input neither the memories.

The second switching circuit 106 selects a signal, which is to be used as the reference pixel value signal S155, according to a reference pixel value changing signal S172 input from the prediction changing unit 110. The selection of the second switching circuit 106 decides either a first decoded and then stored pixel value signal S157 stored in the memory 107, a second decoded and then stored pixel value signal S158 stored in the memory 108, an average decoded pixel value signal S159 obtained by the average calculator 109, or a predetermined value, to be used as the reference pixel value signal S155. In this case, the predetermined value is fixed pixel data which is used when the encoder 102 carries out the intra-frame coding. The selected reference pixel value signal S155 is output to the subtracter 101 and to the adder 104.

The memories 107 and 108 retain the decoded pixel value signal S156 input from the first switching circuit 105 in frames. The average calculator 109 receives temporally different frames of the decoded pixel value signals stored in the memories 107 and 108 by the switching of the first switching circuit 105, and obtains the average of the decoded pixel value signals to generate the average decoded pixel value signal S159. In the first embodiment, the decoded pixel value signal stored in the memories 107 and 108 is either a forward time decoded pixel value signal obtained from a pixel value signal which is located at a forward position on time series from a pixel value signal to be coded, or a backward time decoded pixel value signal obtained from a pixel value signal which is located at a backward position from a pixel value signal to be coded.

The subtracter 101, the encoder 102, the decoder 103, the adder 104, and the average calculator 109, the memory 107, the memory 108, the first switching circuit 105 and the second switching circuit 106 serve as a pixel value signal coding means which codes the input pixel value signal with reference to a pixel value signal which has been decoded.

The prediction changing unit 110 outputs the decoding pixel value changing signal S171, the reference pixel value changing signal S172, the decoding shape changing signal S173 and the reference shape changing signal S174, which are control signals for the first to fourth switching circuit, to control the changing of the output destination of the decoded pixel value signal, the selection of the reference pixel value signal, the changing of the output destination of the decoded shape signal and the selection of reference shape signal, in the respective switching circuits. Also, the prediction changing unit 110 serves as a coding reference specification signal generating means for generating the prediction selection signal S175 which is obtained by coding the result of the output of the reference pixel value changing signal used as the reference pixel value specification signal specifying the reference pixel value signal and the reference shape changing signal used as the reference shape specification signal specifying the reference shape signal.

The encoder (for shape signals) 111 subjects an input shape signal S161, which is the input into the image coding apparatus, to a compression coding which is carried out referring to a reference shape signal S166 output from the fourth switching circuit 114 described hereinafter to generate a coded shape signal S162. The decoder (for shape signals) 112 subjects the coded shape signal S162 to a decoding process which is the converse process of the coding process with reference to the reference shape signal S166 output from the fourth switching circuit 114 to generate a decoded shape signal S163.

The third switching circuit 113 switches the output destinations for the decoded shape signal S163 according to a decoding shape changing signal S173 input from the prediction changing unit 110. The switching of the third switching circuit 113 decides either that the decoded shape signal S163 is input and stored in the memory 115 or the memory 116, or that the decoded shape signal S163 is input neither the memories.

The fourth switching circuit 114 selects a signal, which is to be used as the reference shape signal S166, according to a reference shape changing signal S174 input from the prediction changing unit 110. The selection of the fourth switching circuit 114 decides whether to use either a first decoded and then stored shape signal S164 retained in the memory 115, a second decoded and then stored shape signal S165 retained in the memory 116, or a predetermined value, as the reference shape signal S166. The selected reference shape signal S166 is output to the encoder 111 and to the decoder 112.

The memories 115 and 116 retain the decoded shape signal S163 input from the third switching circuit 113 in frames. In the first embodiment, the decoded shape signal stored in the memories 115 and 116 is either a forward time decoded shape signal obtained from a shape signal which is located at a forward position from a shape signal to be coded, or a backward time decoded shape signal obtained from a shape signal which is located at a backward position from the shape signal to be coded.

The encoder 111, the decoder 112, the memories 115 and 116, the third switching circuit 113, and the fourth switching circuit 114 serve as a shape signal coding means which codes a shape signal referring to a decoded shape signal.

FIG. 2(a) to FIG. 2(c) are diagrams for explaining the coding of a shape signal by the image coding apparatus according to the first embodiment. The operation of the image coding apparatus according to the first embodiment is described as follows, referring to FIG. 1 and FIG. 2(a) to FIG. 2(c).

When the input pixel value signal S151 and the input shape signal S161 are input into the image coding apparatus according to the first embodiment, the input pixel value signal S151 is input to the subtracter 101 while the input shape signal S161 is input to the encoder (for shape signals) 111.

The subtracter 101 receives the input pixel value signal S151 and the reference pixel value signal S155 output from the second switching circuit 106, and outputs the difference pixel value signal S152 obtained by the subtracting process to the encoder 102. The encoder 102 subjects the difference pixel value signal S152 to the predetermined compression coding process to generate the coded pixel value signal S153. The coded pixel value signal S153 becomes part of the output of the image coding apparatus according to the first embodiment while it is input to the decoder 103. The decoder 103 subjects the received coded pixel value signal S153 to the decoding process, which is the converse process of the coding process of the encoder 102, to generate the coded and then decoded pixel value signal S154. The coded and then decoded pixel value signal S154 is output to the adder 104.

The adder 104 receives the coded and then decoded pixel value signal S154 and the reference pixel value signal S155 output from the second switching circuit 106, and outputs the decoded pixel value signal S156 obtained by the adding process to the first switching circuit 105.

The first switching circuit 105 outputs the input decoded pixel value signal S156 to the memory 107 or 108 according to the decoding pixel value changing signal S171. The memories 107 and 108 retain the input decoded pixel value signal S156 in flames. The first switching circuit 105 abandons the decoded pixel value signal S156 not to be output to any memories when the decoding pixel value changing signal S171 instructs the first switching circuit 105 not to retain the decoded pixel value signal S156.

The prediction changing unit 110 instructs the first switching circuit 105 through the decoding pixel value changing signal S171 to output the decoded pixel value signal S156 alternately to the memory 107 and to the memory 108 in principle so that the decoded pixel value signal S156 is output to either memory different from the other memory into which the pixel value signal S156 is previously output. The decoding pixel value changing signal S171 also instructs the first switching circuit 105 to abandon the decoded pixel value signal S156 when the decoded pixel value signal S156 is a signal which is not to be referred in the coding process.

The decoded pixel value signal S156 input to the memory 107 or 108 is retained as the first decoded and then stored pixel value signal S157 or the second decoded and then stored pixel value signal S158, respectively. The average calculator 109 receives the first decoded and then stored pixel value signal S157 and the second decoded and then stored pixel value signal S158 and obtains the average of them to generate the average decoded pixel value signal S159.

The second switching circuit 106 selects either the predetermined value, the first decoded and then stored pixel value signal S157, the second decoded and then stored pixel value signal S158, or the average decoded pixel value signal S159, according to the reference pixel value changing signal S172 from the prediction changing unit 110, to output the selected signal as the reference pixel value signal S155 to the subtracter 101 and the adder 104.

The second switching circuit 106 is instructed with the use of the reference pixel value changing signal S172 from the prediction changing unit 110 in a way that follows. When a coding object to be subjected to the coding process in the encoder 102 is an I frame, the second switching circuit 106 is instructed to select the predetermined value since the coding is carried out without the reference process. Hence the predetermined value which is used in the intra-frame coding is output as the reference pixel value signal S155.

When the coding object in the encoder 102 is a P flame, the prediction changing unit 110 instructs the second switching circuit 106 to select, among the first decoded and then stored pixel value signal S157 and the second decoded and then stored pixel value signal S158, the one which is at a forward position on time series from the coding object.

When the coding object in the encoder 102 is a B flame, the prediction changing unit 110 instructs the second switching circuit 106 to select either the first decoded and then stored pixel value signal S157, the second decoded and then stored pixel value signal S158, or the average decoded pixel value signal S159. In the first embodiment, the prediction changing unit 110 selects the signal that has the smallest difference which is to be obtained in the subtracter 101 of the signals which are possible to be selected. Hence an image which is to make the motion detection error of the pixel value signal the smallest is selected as a reference image among an image which is earlier than an image to be coded, an image which is later than an image to be coded, or an image which is obtained from the average of them.

Moreover, when the coding object is a P frame or B frame, both intra-frame coding and inter-frame coding can be carried out, and also the prediction changing unit 110 can instruct the second switching circuit 106 to select the inter-frame coding depending on conditions and to output the determined value.

The above-described coding process for the input pixel value signal S151 is similar to that in the case where the prior art intra-frame coding and inter-frame coding are carried out. Especially in the coding process for the B frame, the coding efficiency is improved by selecting one among plural reference candidates.

On the other hand, in the image coding apparatus according to the first embodiment, the input shape signal S161, which is the input of the apparatus, is input to the encoder (for shape signals) 111 and is subjected to a compression coding in the encoder 111. This compression coding is carried out with reference to the decoded shape signal S166 output from the fourth switching circuit 114 which will be described hereinafter. The encoder 111 outputs the coded shape signal S162, which is generated by the coding process, as part of the output of the image coding apparatus, and the coded shape signal S162 is also input to the decoder (for shape signals) 112.

The decoder 112 subjects the input coded shape signal S162 to the decoding process which is the converse process of the coding process in the encoder 111 to generate the decoded shape signal S163. This decoding process is carried out with reference to the reference shape signal S166 output from the fourth switching circuit 114.

The decoded shape signal S163 is output to the third switch circuit 113. The third switching circuit 113 outputs the input decoded shape signal S163 to the memory 115 or the memory 116 according to the instruction of the decoding shape changing signal S173 output from the prediction changing unit 110. The memories 115 and 116 contain the input decoded shape signal S163 in frames. The third switching circuit 113 abandons the decoded shape signal S163 not to be output to any memories when the decoding shape changing signal S173 instructs the third switching circuit 113 not to retain the decoded shape signal S163.

The prediction changing unit 110 instructs the third switching circuit 113 through the decoding pixel value changing signal S173 to output the decoded shape signal S163 alternately to the memory 115 and to the memory 116 in principle so that the decoded shape signal S163 is output to either memory different from the other memory into which the decoded shape signal S163 is previously output. The decoding shape changing signal S173 also instructs the third switching circuit 113 to abandon the decoded shape signal S163 when the decoded shape signal S163 is a signal which is not to be referred in the coding process. The decoded shape signal S163 input to the memory 115 or 116 is retained as the first decoded and then stored shape signal S164 or the second decoded and then stored shape signal S165, respectively.

The fourth switching circuit 114 selects either the predetermined value, the first decoded and then stored shape signal S164, or the second decoded and then stored shape signal S165, according to the reference shape changing signal S174 from the prediction changing unit 110, to output the selected signal as the reference shape signal S166 to the encoder 111 and the decoder 112.

FIG. 2(a) to FIG. 2(c) are diagrams for explaining the coding process with references for shape signals. FIG. 2(a) shows a decoded shape signal at time t0 which is obtained by coding a shape signal which is positioned at forward time t0 on time series from a shape signal at time t1 to be coded and then decoding the same. FIG. 2(c) shows a decoded shape signal at time t2 which is obtained by coding a shape signal which is positioned at backward time t2 on time series from a shape signal at time t1 to be coded and then decoding the same. As described above, the coding efficiency is not necessarily improved for the shape signal which is two-valued information, even if a difference value between shape signals is obtained referring to temporarily adjacent information or the average of plural information which are located at forward and backward position on time series is referred. However, there are some cases where a process based on the temporal correlation is effective.

As shown in FIG. 2, the shape signal of an image at time t1 to be coded is partly the same as the shape signal of the decoded image at forward time t0 shown in FIG. 2(a) and as the shape signal of the decoded image at backward time t2 shown in FIG. 2(c). In this case, the coding efficiency can be improved by generating a predicted shape signal with the use of the temporarily forward and backward adjacent decoded shape signals. To improve the precision of the prediction, a decoded shape signal used for the prediction should be selected for each appropriate unit of a shape signal to be coded. Accordingly, in the first embodiment, a prediction method for coding the shape signal is selected apart from the selection of the reference image for coding the pixel value signal, whereby the coding efficiency is improved by the process with reference in coding the shape signal.

In the image coding apparatus according to the first embodiment, the prediction changing unit 110 instructs the fourth switching circuit 114 through the reference shape changing signal S174 to select a signal which is to have the smallest output bit number in the encoder 111 and output it as the reference shape signal S166. Accordingly, the encoder 111 carries out one which has the best coding efficiency of an intra-frame coding without reference but with the use of the reference shape signal S166 which is the predetermined value, and an inter-frame coding referring to the shape signal at forward time or backward time with the use of the reference shape signal S166 which is the first or second decoded and then stored shape signal S164 or S165.

When the input pixel value signal S151 and the input shape signal S161 are coded as described above, the prediction changing unit 110 generates and outputs the decoding pixel value changing signal S171, the reference pixel value changing signal S172, the decoding shape changing signal S173 and the reference shape changing signal S174 for controlling each switching circuit. The prediction changing unit 110 also codes each generated changing signal to generate a prediction selection signal S175. The prediction selection signal S175 is the output of the image coding apparatus according to the first embodiment as well as the coded pixel value signal S153 and the coded shape signal S162, all of which are used in the decoding process.

As described above, the image coding apparatus according to the first embodiment comprises the subtracter 101, the encoder (for pixel value signals) 102, the decoder (for pixel value signals) 103, the adder 104, the first switching circuit 105, the second switching circuit 106, the memories 107 and 108, the average calculator 109, the prediction changing unit 110, the encoder (for shape signals) 111, the decoder (for shape signals) 112, the third switching circuit 113, the fourth switching 114, and the memories 115 and 116. Therefore, the prediction changing unit 110 controls separately and independently the selection of the reference pixel value signal used for coding the input pixel value signal S151 in the second switching circuit 106 and the selection of the reference shape signal used for coding the input shape signal S161 in the fourth switching circuit 114, whereby the coding efficiency can be improved for both the input pixel value signal and the input shape signal.

In the first embodiment, the prediction changing unit 110 instructs the fourth switching circuit 114 to do the selection whereby the output of the encoder 111 has the smallest bit number. However this is among examples. The control of the fourth switching circuit 114 by the prediction changing unit 110 can be determined in another way according to the property of the image to be coded or the performance and processing status of the image coding apparatus. For example, by supervising the free amount of the send buffer when the result of the coding in the first embodiment is sent, the intra-frame coding gets a priority to be first carried out when the free amount is large.

Embodiment 2

An image decoding method and an image decoding apparatus according to a second embodiment of the present invention appropriately decode the result of the image coding process according to the first embodiment.

Figure 3:
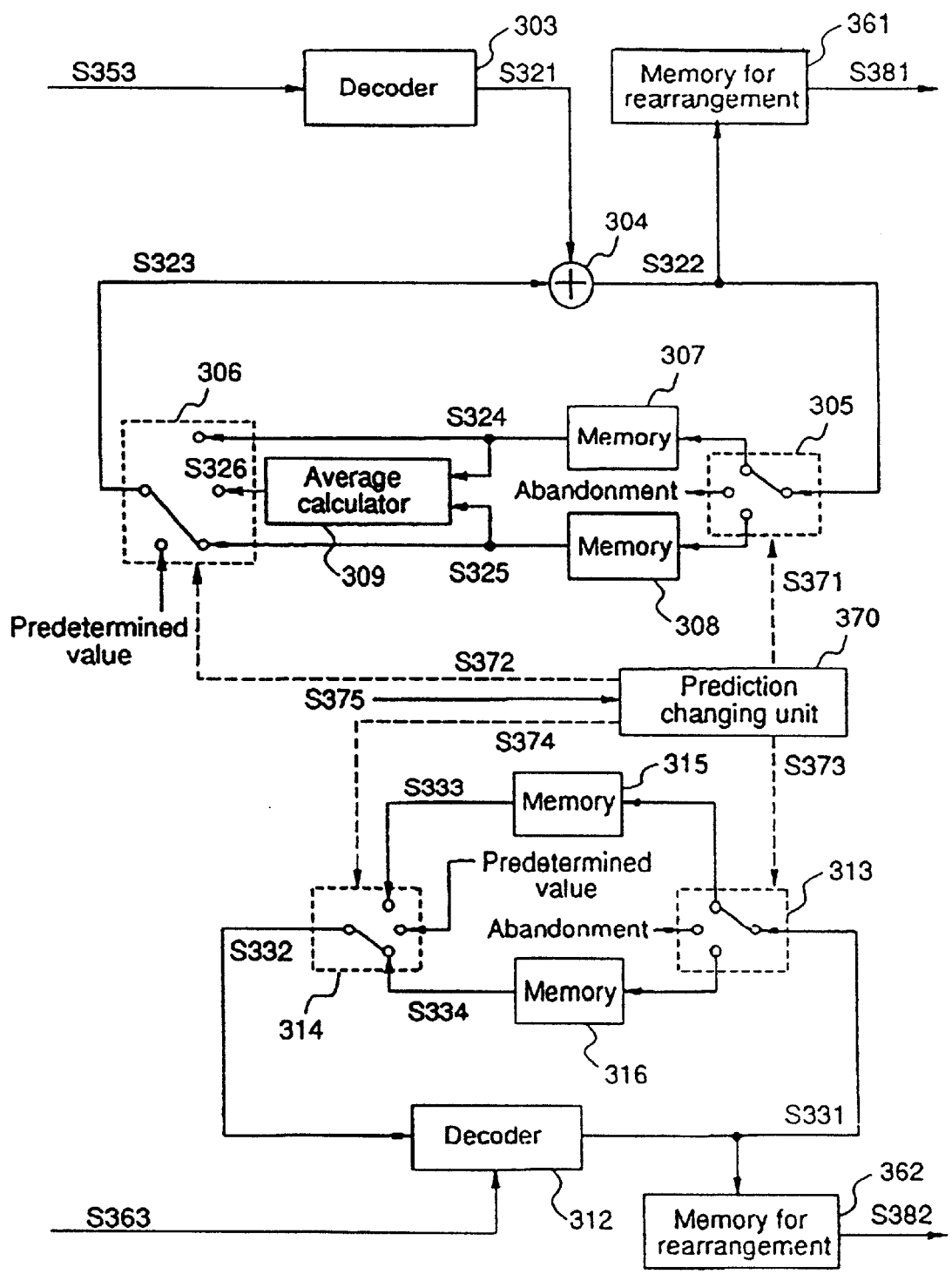
FIG. 3 is a block diagram showing the configuration of an image decoding apparatus according to a second embodiment of the present invention.

FIG. 3 is a block diagram showing the configuration of the image decoding apparatus according to the second embodiment. As shown in the figure, the image decoding apparatus according to the second embodiment comprises a decoder (for pixel value signals) 303, an adder 304, a first switching circuit 305, a second switching circuit 306, a memory (a first memory for retaining decoded pixel value signals) 307, a memory (a second memory for retaining decoded pixel value signals) 308, an average calculator 309, a decoder (for shape signals) 312, a third switching circuit 313, a fourth switching circuit 314, a memory (a first memory for retaining shape signals) 315, a memory (a second memory for retaining shape signals) 316, a memory for rearrangement (for pixel value signals) 361, a memory for rearrangement (for shape signals) 362, and a prediction changing unit 370.

In the figure, the decoder (for pixel value signals) 303, the adder 304, the first switching circuit 305, the second switching circuit 306, the memories 307 and 308, and the average calculator 309 are similar to 103 to 109 of the first embodiment, which serve as a pixel value signal decoding means which decodes the input coded pixel value signal referring to the decoded reference pixel value signal. The decoder (for shape signals) 312, the third switching circuit 313, the fourth switching circuit 314, and the memories 315 and 316 are similar to 112 to 116 of the first embodiment, which serve as a shape signal decoding means which decodes the input coded shape signal referring to the decoded reference shape signal.

The memories for rearrangement 361 and 362 retain the result of decoding for rearrangement to be required. As described using FIG. 14, when the coding process accompanying the bidirectional reference is carried out, the image which is at a backward position on time series is first coded. Accordingly, if the input result of the coding is simply decoded and output according to the input order, the result of the decoding does not sometimes agree with the original image. Hence the input result of the coding is once retained in the memories for rearrangement, and then read and output according to the correct order.

The prediction changing unit 370 decodes the input prediction selection signal to obtain a control signal for each switching circuit output by the prediction changing unit 110 (FIG. 1), and based on the control signal, output the changing signal to each switching circuit to indicate the reference signal for the decoding of the pixel value signal and the shape signal, whereby the prediction changing unit 370 serves as a decoded reference specification signal generating means.

A description is given of the operation of the image decoding apparatus according to the second embodiment so constructed, as follows.

The image decoding apparatus according to the second embodiment receives an input coded pixel value signal S353, an input coded shape signal S363 and an input prediction selection signal S375. The input coded pixel value signal S353, the input coded shape signal S363 and the input prediction selection signal S375 correspond to the outputs of the image coding apparatus according to the first embodiment, namely, the coded pixel value signal S153, the coded shape signal S162 and the prediction selection signal S175, respectively. In the image decoding apparatus according to the second embodiment, the input coded pixel value signal S353 is input to the decoder (for pixel value signals) 303, the input coded shape signal S363 is input to the decoder (for shape signals) 312, and the input prediction selection signal S375 is input to the prediction changing unit 370.

The prediction changing unit 370 subjects the input prediction selection signal S375 to the decoding process to obtain either a decoding pixel value changing signal, a reference pixel value changing signal, a decoding shape changing signal, or a reference shape changing signal. The prediction changing unit 370 outputs a decoding pixel value changing signal S371, a reference pixel value changing signal S372, a decoding shape changing signal S373 and a reference shape changing signal S374 to the first to fourth switching circuit, depending on the obtained signal.

The decoder (for pixel value signals) 303 subjects the coded pixel value signal S353 to the decoding process to generate a coded and then decoded pixel value signal S321 which is output to the adder 304. The adder 304 receives a reference pixel value signal S323 and adds the coded and then decoded pixel value signal S321 to the reference pixel value signal S323 to generate a decoded pixel value signal S322. The decoded pixel value signal S322 is input and retained in the memory for rearrangement 361 while being output to the first switching circuit 305.

The first switching circuit 305, similarly to the first embodiment, switches the output destinations of the decoded pixel value signal S322 according to the decoding pixel value changing signal S371 output from the prediction changing unit 370. Hence the decoded pixel value signal S322 is retained either in either of the memories or in neither of the memories. The average calculator 309 receives the signals, which are retained in the memories 307 and 308, obtains the average of the signals and then generates an average decoded pixel value signal S326.

The second switching circuit 306, similarly to the first embodiment, selects a signal used as the reference pixel value signal S323 according to the reference pixel value changing signal S372 output from the prediction changing unit 370. According to the selection, the second switching circuit 306 outputs either a predetermined value, a first decoded and then stored pixel value signal S324 retained in the memory 307, a second decoded and then stored pixel value signal S325 retained in the memory 308, or an average decoded pixel value signal S326, to the adder 304 as the reference pixel value signal S323.

As described above, the decoding pixel value changing signal S371 and the reference pixel value changing signal S372 output by the prediction changing unit 370 are the same as those output by the image coding apparatus according to the first embodiment. Similarly to the first embodiment, the selection of the first switching circuit 305 executes the storage of the memories 307 and 308. Similarly to the first embodiment, the selection of the second switching circuit 306 makes the reference signal similar to that employed in the coding process employed in the decoding process.

On the other hand, the decoder (for shape signals) 312 decodes the input coded shape signal S363 using a reference shape signal S332 input from the fourth switching circuit 314 to generate a decoded shape signal S331. The decoded shape signal S331 is retained in the memory for rearrangement 362 while being output to the third switching circuit 313. The third switching circuit 313, similarly to the first embodiment, switches the output destinations of the decoded shape signal S331 according to the decoding shape changing signal S373. Hence the decoded shape signal S331 is retained either in either of the memories or in neither of the memories.

The fourth switching circuit 314, similarly to the first embodiment, selects a signal used as the reference shape signal S332 according to the reference shape changing signal S374 output from the prediction changing unit 370. According to the selection, either a predetermined value, a first decoded and then stored shape signal S333 retained in the memory 315 or a second decoded and then stored shape signal S334 retained in the memory 316 is output as the reference shape signal S332 from the fourth switching circuit 314 to the decoder (for shape signals) 312.

As described above, the decoding shape changing signal S373 and the reference shape changing signal S374 output by the prediction changing unit 370 are the same as those output by the image coding apparatus according to the first embodiment. Similarly to the first embodiment, the selection of the third switching circuit 313 executes the storage of the memories 315 and 316. Similarly to the first embodiment, the selection of the fourth switching circuit 314 makes the reference signal similar to that employed in the coding process employed in the decoding process.

The decoded pixel value signal S322 processed using the appropriate reference pixel value signal S323, and the decoded shape signal S331 processed using the appropriate shape signal S332 each are retained in the memories for rearrangement 361 and 362, respectively. The image decoding apparatus outputs the result of decoding a pixel value signal, S381, and the result of decoding a shape signal, S382.

The image decoding apparatus according to the second embodiment comprises the decoder (for pixel value signals) 303, the adder 304, the first switching circuit 305, the second switching circuit 306, the memories 307 and 308, the average calculator 309, the decoder (for shape signals) 312, the third switching circuit 313, the fourth switching circuit 314, the memories 315 and 316, the memory for rearrangement (for pixel value signals) 361, the memory for rearrangement (for shape signals) 362, and the prediction changing unit 370. The prediction changing unit 370 employs the control signals based on the size obtained by decoding the input prediction selection signal S375 to instruct each switching circuit for its selection. Therefore, both the input coded pixel value signal S353 and the input coded shape signal S363 which have been efficiently coded by the image coding apparatus according to the first embodiment can be appropriately decoded.

Embodiment 3

An image coding method and an image coding apparatus according to a third embodiment of the present invention control the pixel value signal process and the shape signal process, similarly to the image coding process according to the first embodiment.

The configuration of the image coding apparatus according to the third embodiment is similar to that in the first embodiment. Hence FIG. 1 is used for the explanation. Also, in the operation of the image coding apparatus according to the third embodiment, the coding process for the pixel value signal and the shape signal is carried out similarly to that in the first embodiment.

The image coding apparatus according to the third embodiment differs from that according to the first embodiment in the method of generating the prediction selection signal S175 by the prediction changing unit 110. FIG. 4(a) and FIG. 4(b) are diagrams for explaining the method of code assignment when the prediction selection S175 is generated in the image coding apparatus according to the third embodiment. A description is given of the generation method of the prediction selection signal S175 by the prediction changing unit 110 according to the third embodiment, referring to FIG. 4, as follows.

FIG. 4(a) shows the code assignment in the shape signal processing. In FIG. 1, the prediction changing unit 110 generates the prediction selection signal S175, which is a code '0', '10', or '11', assigned according to what the prediction changing unit 110 instructs the fourth switching circuit 114 using the reference shape changing signal S174, namely, 'predetermined value reference' which indicates the coding with the predetermined value, 'forward reference' which indicates the coding with reference to an image at a forward position on time series, or 'backward reference' which indicates the coding with reference to an image at a backward position on time series.

FIG. 4(b) shows the code assignment in the pixel value signal processing. In FIG. 1, the prediction changing unit 110 generates the prediction selection signal S175, which is a code '00', '01', '10', or '11', assigned according to what the prediction changing unit 110 instructs the second switching circuit 106 using the reference pixel value changing signal S172, namely, 'predetermined value reference' which indicates the coding with the predetermined value, 'forward reference' which indicates the coding with reference to an image at a forward position on time series, 'backward reference' which indicates the coding with reference to an image at a backward position on time series, or 'bidirectional reference' which indicates the coding with reference to images at a forward and backward positions on time series.

In each case, when the predetermined value is a fixed value, 'predetermined value reference' means the intraframe coding.

As described above, the image coding apparatus according to the third embodiment has the configuration similar to that of the image coding apparatus according to the first embodiment, and the prediction changing unit 110 generates the prediction selection signal S175 based on the predetermined code assignments each corresponding to the control signal used in the coding of the input pixel value signal and to the control signal used in the coding of the input shape signal. As a result, similarly to the first embodiment, each input signal is efficiently coded, and the decoding process can be appropriately carried out by utilizing information on the reference process used in the decoding process.

Moreover, the code assignment shown in FIG. 4 is among examples, and various assignments can be employed. It is also possible to assign a short code length to a case having the high frequency of occurrence and reduce the total bit number.

Embodiment 4

An image coding method and an image coding apparatus according to a fourth embodiment of the present invention, similarly to the image coding process according to the third embodiment, concern about the generation method of the prediction selection signal.

The configuration of the image coding apparatus according to the fourth embodiment is similar to that in the first embodiment. Hence FIG. 1 is used for the explanation. Also, in the operation of the image coding apparatus according to the fourth embodiment, the coding process for the pixel value signal and the shape signal is carried out similarly to that in the first embodiment.

The image coding apparatus according to the fourth embodiment differs from that in the first embodiment in the method of generating the prediction selection signal S175 by the prediction changing unit 110. FIG. 5(a) and FIG. 5(b) are diagrams for explaining the method of code assignment when the prediction selection S175 is generated in the image coding apparatus according to the fourth embodiment. A description is given of the generation method of the prediction selection signal S175 by the prediction changing unit 110 according to the fourth embodiment, referring to FIG. 5, as follows.

Although the signals for the information on the shape signal processing and the information on the pixel value signal are separately generated in the third embodiment, the code assignment is defined for the combination of both the pieces of information in the fourth embodiment. As shown in FIG. 5, in the fourth embodiment, when 'predetermined value reference', 'forward reference' or 'backward reference' is selected in both the pixel value signal processing and the shape signal processing, the prediction selection signal S175 is assigned the shortest code length, while when 'bidirectional reference' is selected in the pixel value signal processing and 'forward reference" or "backward reference" is selected in the shape signal processing, the prediction selection signal S175 is assigned the second shortest code length.

As described in the first embodiment, the coding process for the pixel value signal and the coding process for the shape signal are also separately and independently controlled in the image coding apparatus according to the fourth embodiment, but there is generally some correlation between the selection of the reference signal for the pixel value signal and the selection of the reference signal for the shape signal. This shows that when 'forward reference" is selected since, for example, either has a strong correlation with an image at a forward position on time series, the same selection is done for the other.

Accordingly, in the image coding apparatus according to the fourth embodiment, when S175 is generated, an event having the large frequency of occurrence is assigned a short code length by the code assignment where the correlation is taken into account, so that the code length of the prediction selection signal S175 is more reduced than in the case of the third embodiment and also the total coding efficiency can be improved.

As described above, the image coding apparatus according to the fourth embodiment has the configuration similar to that of the image coding apparatus according to the first embodiment, and the prediction changing unit 110 generates the prediction selection signal S175 based on the predetermined code assignment where the choices for both the signals are combined, the code assignment corresponding to the control signal used in the coding of the input pixel value signal and to the control signal used in the coding of the input shape signal. As a result, similarly to the first embodiment, each input signal is efficiently coded, and the information on the reference process used in the coding process can be efficiently coded to the prediction selection signal.

Moreover, the code assignment shown in FIG. 5 is among examples, and various assignments can be employed. It is also possible to assign a code length corresponding to the frequency of occurrence and obtain the similar effects.

Embodiment 5

An image coding method and an image coding apparatus according to a fifth embodiment of the present invention, similarly to the image coding process according to the third and fourth embodiments, concern about the generation method of the prediction selection signal.

The configuration of the image coding apparatus according to the fifth embodiment is similar to that in the first embodiment. Hence FIG. 1 is used for the explanation. Also, in the operation of the image coding apparatus according to the fifth embodiment, the coding process for the pixel value signal and the shape signal is carried out similarly to that in the first embodiment.

The image coding apparatus according to the fifth embodiment differs from that in the first embodiment in the method of generating the prediction selection signal S175 by the prediction changing unit 110. FIG. 6(*a*) and FIG. 6(*b*) are diagrams for explaining the method of code assignment when the prediction selection S175 is generated in the image coding apparatus according to the fifth embodiment. A description is given of the generation method of the prediction selection signal S175 by the prediction changing unit 110 according to the fifth embodiment, referring to FIG. 6, as follows.

FIG. 6(*a*) is the code assignment for the coding process of the shape signal, which is the same as that in the third embodiment shown in FIG. 4(*a*). FIG. 6(*b*) is the code assignment for the combination of the coding process of the shape signal and the coding process of the pixel value signal.

In the fifth embodiment, to generate the prediction selection signal S175, the prediction changing unit 110 first carries out the code assignment for the shape signal processing according to FIG. 6(*a*), and then carries out the code assignment for the combination of the shape signal processing and the pixel value signal processing according to FIG. 6(*b*).

For example, when 'forward reference' is selected for the shape signal processing and 'forward reference' is selected for the pixel value signal, the code '10' is first assigned to the prediction selection signal S175 and next the code '0' is assigned to the prediction selection signal S175. On the other hand, when 'forward reference' is selected for the shape signal processing and 'backward reference' is selected for the pixel value signal, the code '10' is first assigned to the prediction selection signal S175 and next the code '100' is assigned to the prediction selection signal S175. FIG. 6(*b*), similarly to FIG. 5, assigns a short code length to a case having the high frequency of occurrence in view of the correlation between the shape signal and the pixel value signal.

As described above, the image coding apparatus according to the fifth embodiment has the configuration similar to that of the image coding apparatus according to the first embodiment, and the prediction changing unit 110 first carries out the code assignment according to the control signal used in the coding process of the input shape signal, and next carries out the code assignment according to the combination of the control signals used in the coding process of the input shape signal and in the coding process of the input pixel value signal, and thus the prediction selection signal S175 is generated. As a result, similarly to the first embodiment, each input signal is efficiently coded, and the information on the reference process used in the coding process can be efficiently coded to the prediction selection signal.

Moreover, the code assignment shown in FIG. 6 is among examples similarly to the third and fourth embodiments. Besides, it is also possible to carry out the assignment of code length according to the frequency of occurrence and obtain the similar effects.

Embodiment 6

An image coding method and an image decoding apparatus according to a sixth embodiment of the present invention appropriately decode the result of the coding obtained from the image coding process according to the third embodiment.

The configuration of the image decoding apparatus according to the sixth embodiment is similar to that in the second embodiment and therefore FIG. 3 is used for the explanation. Also, in the operation of the image decoding apparatus according to the sixth embodiment, the decoding process for the pixel value signal and the shape signal is carried out similarly to the second embodiment.

The image decoding apparatus according to the sixth embodiment receives the result of the coding output from the image coding apparatus according to the third embodiment. The image decoding apparatus according to the sixth embodiment receives a signal treated with the code assignment shown in FIG. 4 as the input prediction selection signal S375 (FIG. 3). In the image decoding apparatus according to the sixth embodiment, the prediction changing unit 370 decodes the input prediction selection signal S375 appropriately, whereby the result of the coding according to the third embodiment is appropriately decoded similarly to the second embodiment.

As described above, the image decoding apparatus according to the sixth embodiment has the configuration similar to the image decoding apparatus according to the second embodiment, and receives the result of the coding according to the third embodiment, and the prediction changing unit 370 decodes the input predication selection signal S375, whereby the result of the coding according to the third embodiment can be appropriately decoded.

Embodiment 7

An image decoding method and an image decoding apparatus according to a seventh embodiment of the present invention appropriately decode the result of the coding obtained from the image coding process according to the fourth embodiment.

The configuration of the image decoding apparatus according to the seventh embodiment is similar to that in the second embodiment and therefore FIG. 3 is used for the explanation. Also, in the operation of the image decoding apparatus according to the seventh embodiment, the decoding process for the pixel value signal and the shape signal is carried out similarly to the second embodiment.

The image decoding apparatus according to the seventh embodiment receives the result of the coding output from the image coding apparatus according to the fourth embodiment. The image decoding apparatus according to the seventh embodiment receives a signal treated with the code assignment shown in FIG. 5 as the input prediction selection signal S375 (FIG. 3). In the image decoding apparatus according to the seventh embodiment, the prediction changing unit 370 decodes the input prediction selection signal S375 appropriately, whereby the result of the coding according to the fourth embodiment is appropriately decoded similarly to the second embodiment.

As described above, the image decoding apparatus according to the seventh embodiment has the configuration similar to the image decoding apparatus according to the second embodiment, and receives the result of the coding according to the fourth embodiment, and the prediction changing unit 370 decodes the input prediction selection signal S375, whereby the result of the coding according to the fourth embodiment can be appropriately decoded.

Embodiment 8

An image decoding method and an image decoding apparatus according to an eighth embodiment of the present invention decode the result of the coding obtained from the image coding process according to the fifth embodiment.

The configuration of the image decoding apparatus according to the eighth embodiment is similar to that in the second embodiment and therefore FIG. 3 is used for the explanation. Also, in the operation of the image decoding apparatus according to the eighth embodiment, the decoding process for the pixel value signal and the shape signal is carried out similarly to the second embodiment.

The image decoding apparatus according to the eighth embodiment receives the result of the coding output from the image coding apparatus according to the fifth embodiment. The image decoding apparatus according to the eighth embodiment receives a signal treated with the code assignment shown in FIG. 6 as the input prediction selection signal S375 (FIG. 3). In the image decoding apparatus according to the eighth embodiment, the prediction changing unit 370 decodes the input prediction selection signal S375 appropriately, whereby the result of the coding according to the fifth embodiment is appropriately decoded similarly to the second embodiment.

As described above, the image decoding apparatus according to the eighth embodiment has the configuration similar to the image decoding apparatus according to the second embodiment, and receives the result of the coding according to the fifth embodiment, and the prediction changing unit 370 decodes the input prediction selection signal S375, whereby the result of the coding according to the fifth embodiment can be appropriately decoded.

Embodiment 9

An image coding method and an image coding apparatus according to a ninth embodiment of the present invention carry out a control similar to that in the first embodiment, but using different units of the switching for the pixel value signal and the shape signal.

The configuration of the image coding apparatus according to the ninth embodiment is similar to that in the first embodiment and therefore FIG. 1 is used for the explanation. Also, in the operation of the image coding apparatus according to the ninth embodiment, the coding process for the pixel value signal and the shape signal is carried out similarly to the first embodiment.

In the image coding apparatus according to the ninth embodiment, the output of the control signal of the prediction changing unit 110 when the pixel value signal is controlled is different from that when the shape signal is controlled.

Figure 7:
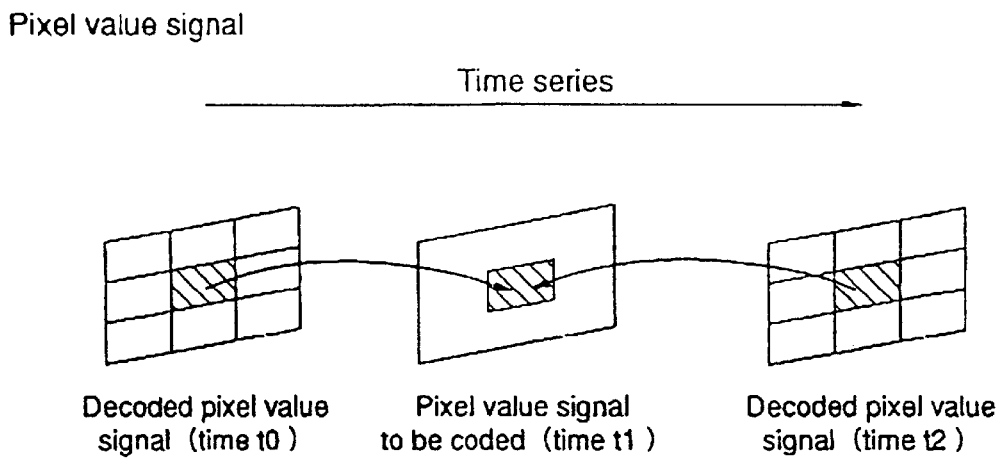
Figure 7:
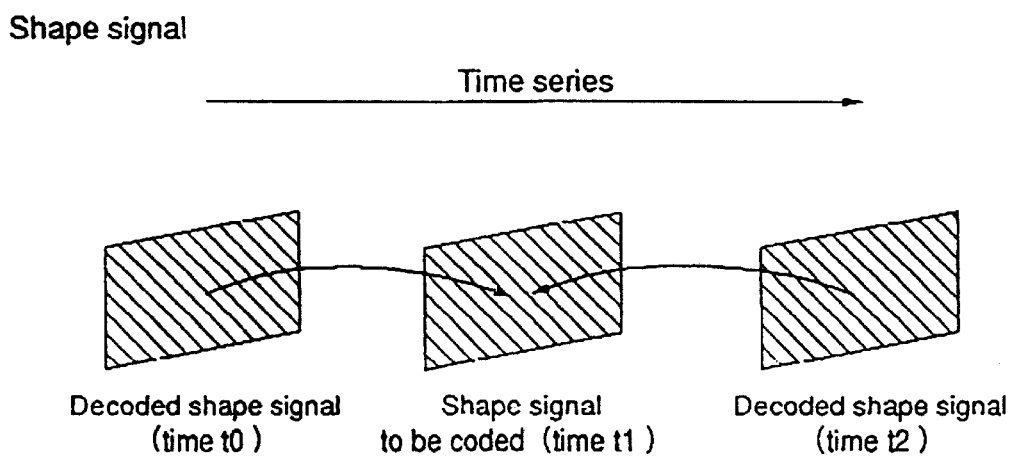

FIG. 7(a) and FIG. 7(b) are diagrams for explaining the units for controlling the switching in the ninth embodiment. FIG. 7(a) is a diagram for describing the reference process for the pixel value signal. As shown in the figure, a frame (a picture) of pixel value signal comprises a plurality of blocks which are the units. This case has the nine blocks. The coding process is carried out for each block. In the ninth embodiment, the control for the pixel value signal is changed for each block. That is, the second switching circuit 106 in FIG. 1 carries out the switching for each block of the input pixel value signal to be coded.

As opposed to this, for the shape signal, a frame is the unit for switching the controls. Thus, the fourth switching circuit 114 carries out the switching for each frame of the input shape signal to be coded.

For the pixel value signal, as shown in FIG. 7(a), when the switching of the reference image is carried out for each block, the prediction precision is improved more possibly than when it is carried out for each frame, and the coding efficiency can be generally improved. As opposed to this, as the shape signal differs from the pixel value signal in the statistical properties, the prediction precision is not usually improved even if the prediction images are switched in small units. This is because the shape signal has different properties from the pixel value signal which consists of the signals which each are almost equally significant, that is, a signal indicating the contour of an object is significant for the shape signal while signals indicating the outside of the contour and the part which is completely included inside of the contour are not very significant.

On the other hand, for the shape signal as well as the pixel value signal, the more amount of code contained in the prediction selection signal S175 increases, the smaller units the switching is carried out in. Hence, for the shape signal, if the switching is carried out in as large units that does not influence the prediction precision, the amount of code of the predication selection signal S175 included in the output of the apparatus is reduced, whereby the total code efficiency can be improved. In the particular case of an apparatus such as a portable remote terminal which sends and receives images, data and the like by an extremely low bit rate coding, since the amount of code which can be assigned to the pixel value and shape signals constituting an image is small, the amount of code of the prediction selection signal is relatively large and therefore the reduction of the amount of code has large effect.

As described above, the image coding apparatus according to the ninth embodiment has the configuration similar to that of the image coding apparatus according to the first embodiment, and the prediction changing unit 110 uses the blocks for the pixel value signal and the frames for the shape signal as the units for controlling the switching, that is, the shape signal where the prediction precision is not influenced much by the size of the unit of the switching is controlled using a relatively large unit, whereby the amount of code of the prediction selection signal S175 which is the output of the apparatus is reduced and therefore the total coding efficiency can be improved. The apparatus is suitable to the case where the process is carried out with an extremely low bit rate.

Further in the ninth embodiment, although the coding process for the shape signal always uses the frame as the unit of the switching, it is possible to use different units of the switching such as both the frame and the block, or to select one of the different units. In this case, the prediction selection signal S175 can contain different hierarchical levels of information such as information of a frame level and information of a block level. For those pieces of information, for example, the information of the frame level specifies the reference method and the information of the block level specifies the intra-frame coding or the coding accompanying the reference, which can be realized by means of the setting of the code assignment and the like.

In the ninth embodiment, for the shape signal, the controls are switched for each frame. This is among examples. The switching can be also controlled, for example, for each macro-blocks or for each group of more blocks. In general, if the pixel value signal and the shape signal each use different units for controlling the switching, and the shape signal uses the larger unit as the unit of the switching, the similar effect is obtained.

Embodiment 10

An image coding method and an image coding apparatus according to a tenth embodiment of the present invention carry out a control, similarly to that of the first embodiment, using different units of the switching for the pixel value signal and the shape signal.

The configuration of the image coding apparatus according to the tenth embodiment is similar to that in the first embodiment and therefore FIG. 1 is used for the explanation. Also, in the operation of the image coding apparatus according to the tenth embodiment, the coding process for the pixel value signal and the shape signal is carried out similarly to the first embodiment.

In the image coding apparatus according to the tenth embodiment, the output of the control signal of the prediction changing unit 110 when the pixel value signal is controlled is different from that when the shape signal is controlled. In the tenth embodiment, for the processing of the pixel value signal the controls are switched for each block similarly to the ninth embodiment. The processing of the shape signal uses a different unit for switching the controls from that in the ninth embodiment.

Figure 8:
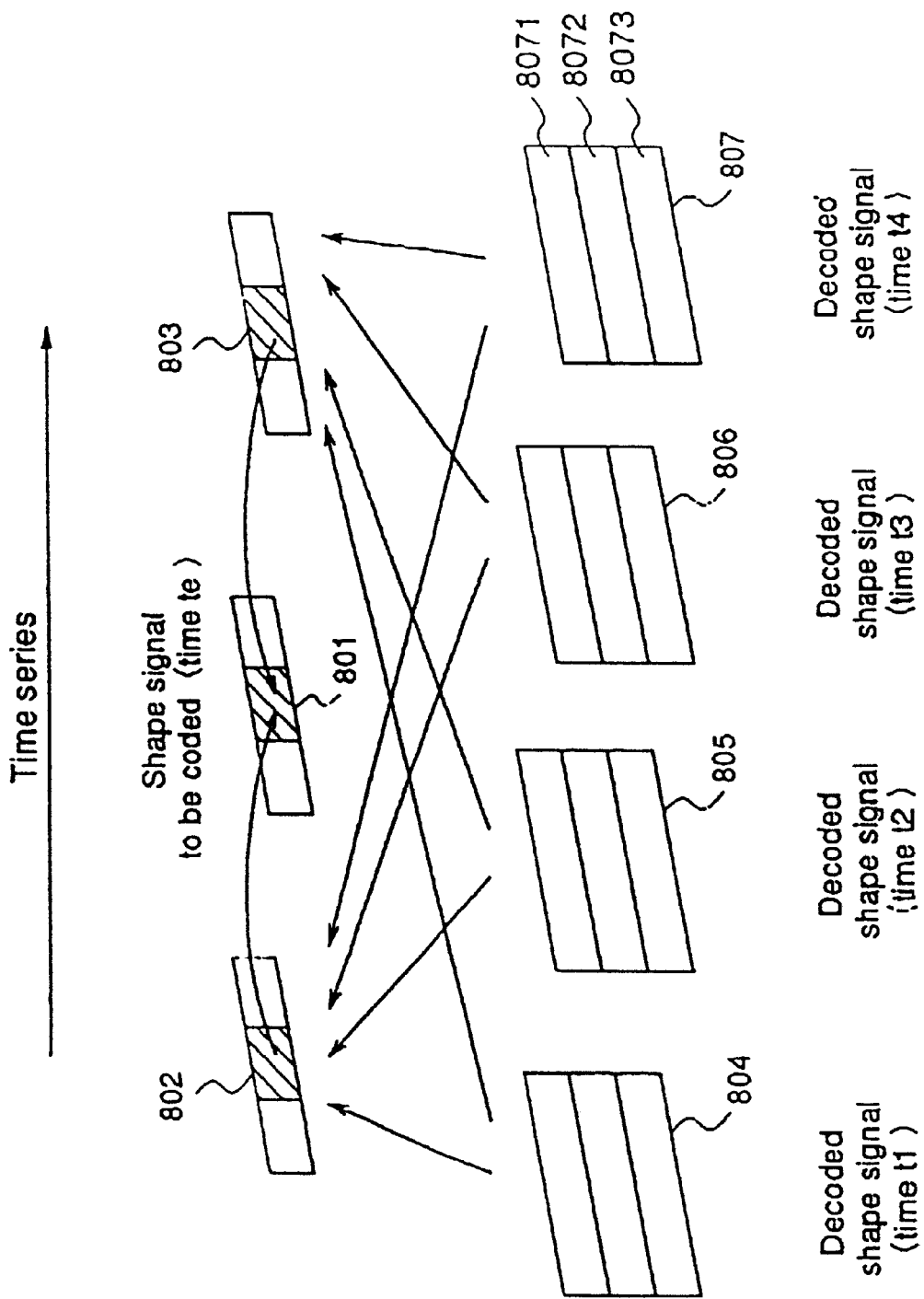
FIG. 8 is a diagram for explaining the changing unit of a shape signal coding process according to a tenth embodiment of the present invention.

FIG. 8 is a diagram for explaining the unit for switching the controls in the shape signal processing in the tenth embodiment. In the figure, frames 804 to 807 are decoded shape signals which are located closely at a forward and backward positions on time series from a shape signal to be coded. The frames 804 to 807 are four pieces of frames positioned at time t1, time t2, time t3 and time t4. In FIG. 1, the memories 115 and 116 each contain the two frames. A frame of shape signal to be coded contains three slices in the tenth embodiment. For example, the frame 807 contains the slices 8071 to 8073.

The slice 801 is contained in a shape signal frame at time te which is to be coded. The slice 801 contains a block to be coded indicated in slant lines. The control of the switching for the shape signal in the tenth embodiment uses a hierarchical unit which consisting of two layers, i.e., a frame and a slice. In the tenth embodiment, two frames are first selected from four frames 804 to 807. A slice 802 and a slice 803, which are positioned where the slice 801 is positioned, are obtained from the selected two frames, respectively. Thereafter, either the slice 802, the slice 803 or a predetermined value is selected and used as the reference signal.

In FIG. 1, the prediction changing unit 110 instructs the fourth switching circuit 114 what to select using the reference shape changing signal S174. When the slice 802 or slice 803 in FIG. 8 is selected, the data of the corresponding part is read from the memory 105 or the memory 106 to be used as the reference shape signal S166.

As described above, the image coding apparatus according to the tenth embodiment has the configuration similar to that of the image coding apparatus according to the first embodiment. In the prediction changing unit 110, the units for controlling the switching are the block for the pixel value signal, and the frame consisting of a large number of blocks and the slice consisting of a small number of blocks for the shape signal, whereby for the shape signal where the prediction precision is not influenced much by the size of the unit, the controls are switched for each relatively large unit, and therefore, the amount of code of the prediction selection signal S175 which is the output of the apparatus is reduced and the total code efficiency can be improved. The apparatus is suitable to a case where the process is carried out with an extremely low bit rate.

Further, in the tenth embodiment, similarly to the ninth embodiment, the controls using different units of the switching (hierarchical unit) are carried out together, or one of the controls is appropriately selected to be carried out, and the prediction selection signal can have plural levels of information.

Still further, although the unit of the switching is described for the processing of the shape signal in both the ninth and tenth embodiments, the change of the unit for switching the controls is possible for processing of the pixel value signal. It is not always required to carry out the switching for each block.

Embodiment 11

An image decoding method and an image decoding apparatus according to an eleventh embodiment of the present invention decode the result of the coding obtained from the image coding process according to the ninth embodiment.

The configuration of the image decoding apparatus according to the eleventh embodiment is similar to that in the second embodiment and therefore FIG. 3 is used for the explanation. Also, in the operation of the image decoding apparatus according to the eleventh embodiment, the decoding process for the pixel value signal and the shape signal is carried out similarly to the second embodiment.

The image decoding apparatus according to the eleventh embodiment receives the result of the coding output from the image coding apparatus according to the ninth embodiment. As described in the ninth embodiment, the result of the coding is obtained from the coding process where the controls are switched for each block of the pixel value signal and for each frame of the shape signal. Accordingly, in the eleventh embodiment, if the prediction changing unit 370 (FIG. 3) outputs a control signal using the appropriate unit of the switching according to the result of the coding, the result of the coding by the ninth embodiment can be properly decoded.

As described above, the image decoding apparatus according to the eleventh embodiment has the configuration similar to the image decoding apparatus according to the second embodiment, and receives the result of the coding by the ninth embodiment, and the controls are switched according to the same units as those in the ninth embodiment, whereby the result of the coding by the ninth embodiment can be appropriately decoded.

Embodiment 12

An image decoding method and an image decoding apparatus according to a twelfth embodiment of the present invention decode the resulting of the coding obtained from the image coding process according to the tenth embodiment.

The configuration of the image decoding apparatus according to the twelfth embodiment is similar to that in the second embodiment and therefore FIG. 3 is used for the explanation. Also, in the operation of the image decoding apparatus according to the twelfth embodiment, the decoding process for the pixel value signal and the shape signal is carried out similarly to the second embodiment.

The image decoding apparatus according to the twelfth embodiment receives the result of the coding output from the image coding apparatus according to the tenth embodiment. As described in the tenth embodiment, the result of the coding is obtained from the coding process where the controls are switched for each hierarchical unit consisting of the frame and the slice for the shape signal. Accordingly, in the twelfth embodiment, if the prediction changing unit 370 (FIG. 3) outputs a control signal using the appropriate unit of the switching according to the result of the coding, the result of the coding by the tenth embodiment can be properly decoded.

As described above, the image decoding apparatus according to the twelfth embodiment has the configuration similar to the image decoding apparatus according to the second embodiment, and receives the result of the coding by the tenth embodiment, and the controls are switched according to the same hierarchical unit as that in the tenth embodiment, whereby the result of the coding by the tenth embodiment can be appropriately decoded.

Embodiment 13

An image coding method and an image coding apparatus according to a thirteenth embodiment of the present invention carry out a control similar to that in the first embodiment, but the selection method of the reference signal in the coding of the shape signal is different.

The configuration of the image coding apparatus according to the thirteenth embodiment is similar to that in the first embodiment and therefore FIG. 1 is used for the explanation. A description is given of the operation of the image coding apparatus according to the thirteenth embodiment.

In the image coding apparatus according to the thirteenth embodiment, a method for controlling the selection of the reference shape signal using the reference shape changing signal S174 is different from that in the first embodiment.

In the first embodiment, when it is decided which a predetermined value, a decoded shape signal at a forward position on time series (at forward time), or a decoded shape signal at a backward position on time series (at backward time) is selected, the one is to be selected which has the short bit number when it is output from the encoder (for shape signals) 111. As opposed to this, in the thirteenth embodiment, when the inter-frame coding is carried out, a differences between the time of the shape signal to be coded and the forward an backward times of the decoded signals are compared and then either which has the smaller difference is employed.

Further, although the prediction selection signals which are to be the output of the apparatus are obtained from coding all the changing signal output from the prediction changing unit, it is also possible to use information on time as information indicating a reference method. In the thirteenth embodiment, the information on time is not coded, but is made, as it is, included in the prediction selection signal.

Figure 14:
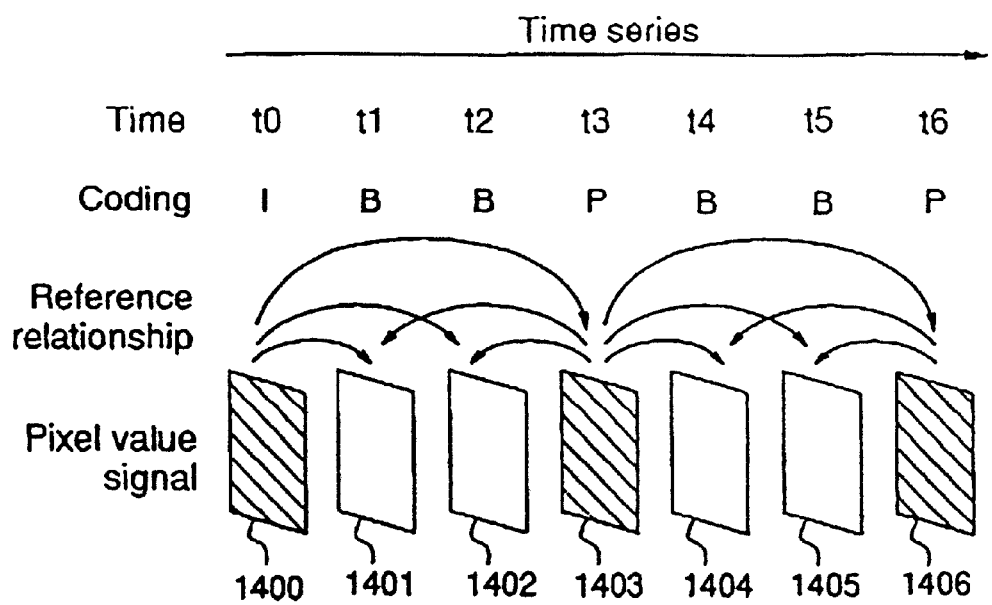
FIG. 14 is a diagram for explaining an image coding process based on temporal correlation in a prior art.
Figure 15:
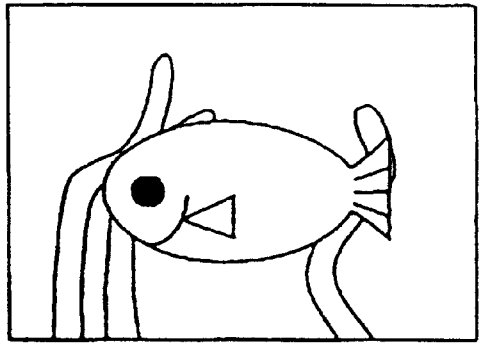
FIG. 15 (a) to FIG. 15 (c) are diagrams for explaining an image coding process carried out for each object in a prior art.
Figure 15:
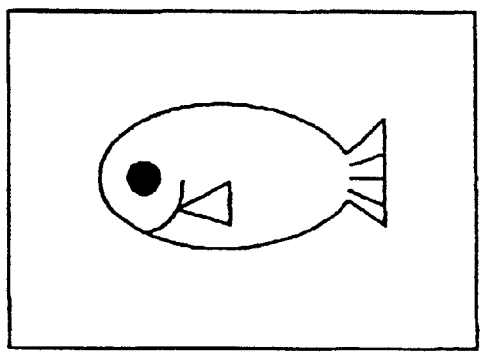
Figure 15:
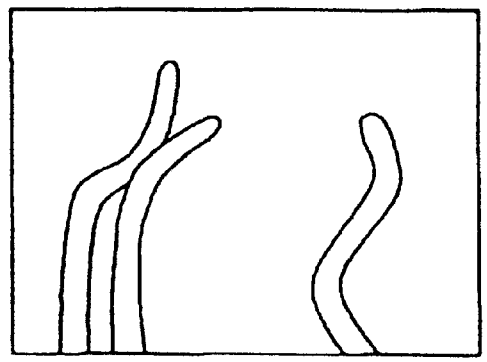
Figure 16:
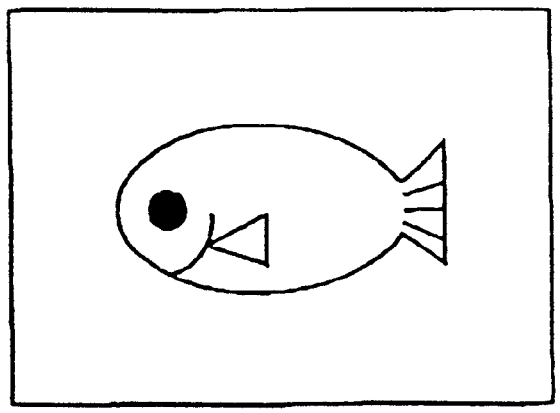
FIG. 16 (a) and FIG. 16 (b) are diagrams for explaining a pixel value and shape signal in an image coding process carried out for each object in a prior art.
Figure 16:
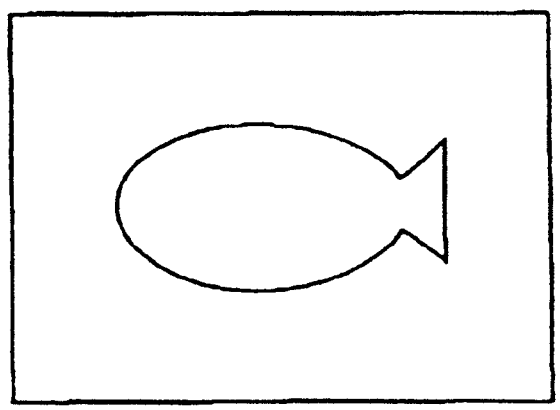

FIG. 9(a) and FIG. 9(b) are diagrams for explaining the image coding process in the thirteenth embodiment. FIG. 9(a) shows the coding of the pixel value signal, which is similar to FIG. 14 used for describing the prior art. FIG. 9(b) shows the coding of the shape signal, corresponding to FIG. 9(a). In the figure, frames 910 to 916 correspond to the frames of pixel value signal 900 to 906, respectively. 'I', 'P' and 'B' and arrows in the figure, similarly to FIG. 14, shows the coding method and the reference relationship. In the figure, t0 to t6 shows the time of the respective frames.

The pixel value signal which is input to the image coding apparatus according to the thirteenth embodiment is coded similarly to the prior art shown in FIG. 14. For the pixel value signal shown in FIG. 9(a), for example, an I frame 900 at a forward position on time series and a P frame 903 at a backward position on time series can be used as a reference signal for a B frame 901. As described above, if either the data at forward time or the data at backward time is selected, or that both the data are used, or that the average of both the data is obtained and used, the prediction precision can be improved. As opposed to this, for the coding of the shape signal, even if both the forward and backward frames are referred, the effect is not necessarily large, so that either is referred for the coding of the shape signal in the thirteenth embodiment.

For example, for a shape signal 911 corresponding to a frame 901, a difference between time t1 and time t0 and a difference between time t1 and t3 are compared and then either frame having the smaller difference is used as a reference signal. In this case, FIG. 9(b) shows a frame 910 is referred because the difference between time t0 and time t1 is the smaller. The other reference relationships are similar.

Figure 9:
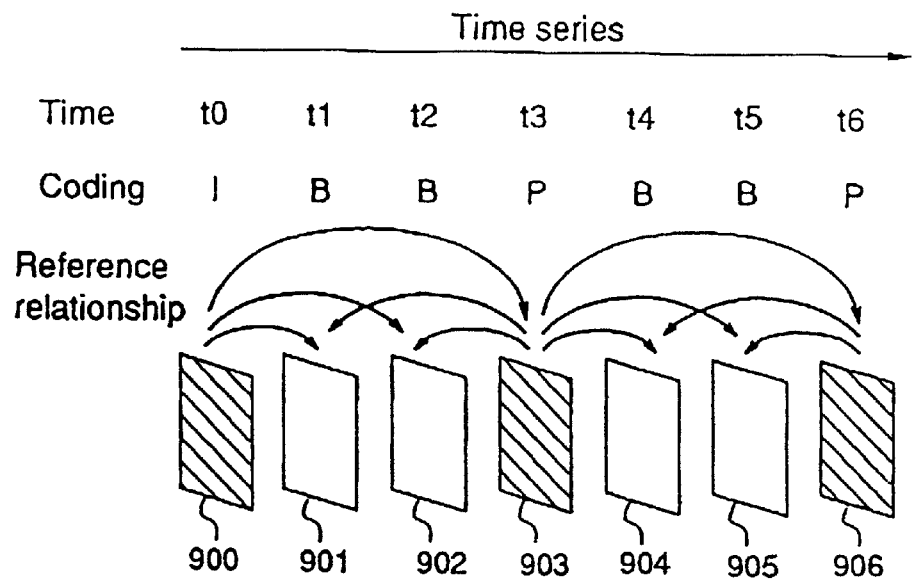
FIG. 9 (a) and FIG. 9 (b) are diagrams for explaining the reference relationship of a coding process according to a thirteenth embodiment of the present invention.
Figure 9:
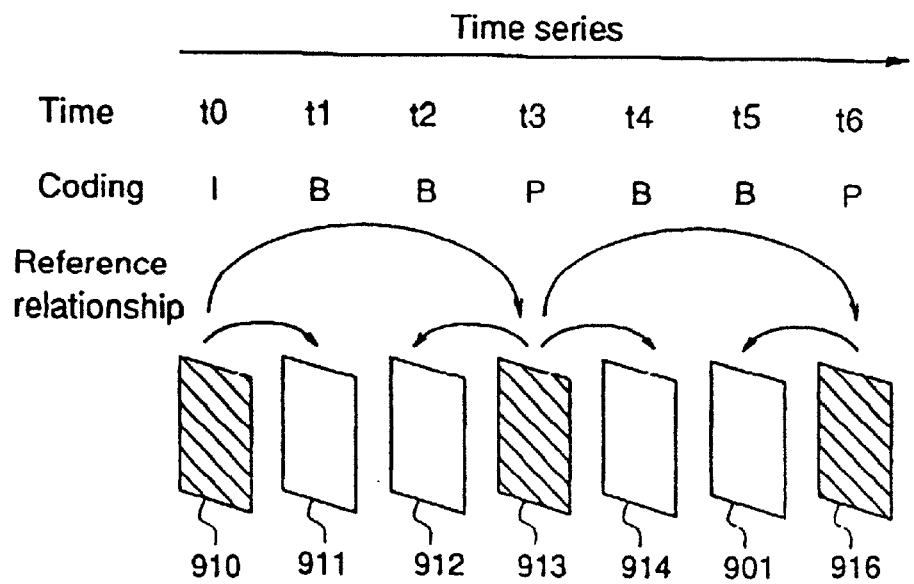
Figure 10:
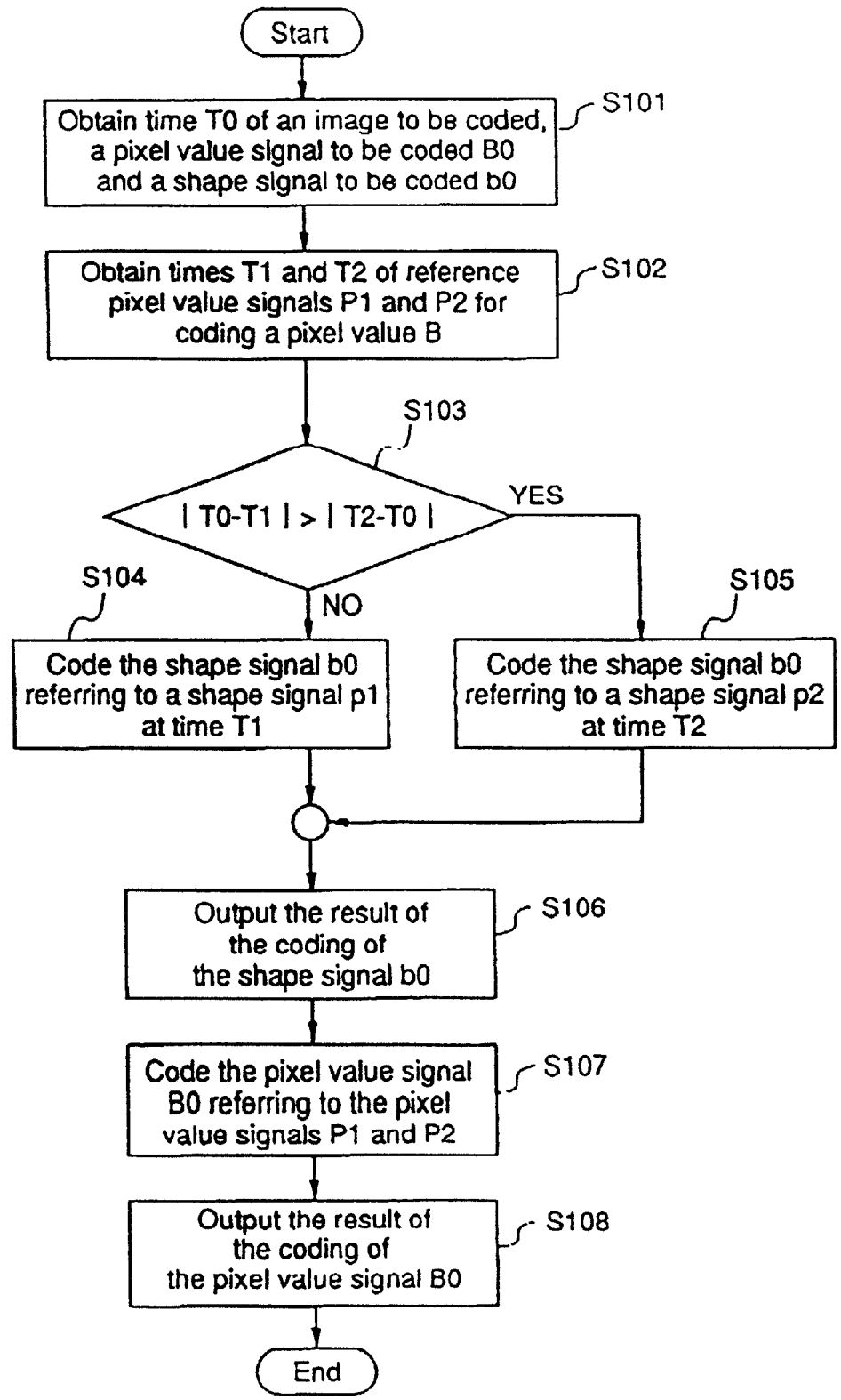
FIG. 10 is a flow chart showing the procedure of a coding process for a B frame according to the thirteenth embodiment.

FIG. 10 is a flowchart showing the procedure of the coding process of the pixel value and shape signals constituting an image signal of B frame. The process for the frame 901 in FIG. 9(a) and the shape signal 911 is described according to the flow of FIG. 10, as follows.

At step 101, time T0 of an image to be coded, a pixel value signal B0 and a shape signal b0 which constitute the image to be coded, are obtained. In FIG. 9(a) and FIG. 9(b), T0 corresponds to t1, the pixel value signal B0 corresponds to the frame 901, and the shape signal b0 corresponds to the frame 911. At step 102, times T1 and T2 of pixel value signals P1 and P2 which are to be used as reference signals are obtained in the coding process for the pixel value signal B0. As shown in FIG. 9(a), the frame 901 refers the frames 900 and 903, and thus T1 corresponds to t0 and T2 corresponds to t3.

At step 103, differences between T0 obtained at step 101, and T1 and T2 which are obtained at step 102, are calculated, and then the absolute values of the differences are compared. Thereafter, step 104 or step 105 is executed according to the result of the comparison. In FIG. 9(a) and FIG. 9(b), the time difference between t1 and t0 is smaller than that between t0 and t3, and therefore in this case, step 104 is executed.

At step 104, the shape signal to be coded b0 is coded referring to the shape signal p1 at time T1. In FIG. 9(a) and FIG. 9(b), the shape signal at time t0 which corresponds to time T1 is a shape signal 910, so that the shape signal 911 is coded referring to the shape signal 910. Thereafter, at step 106, a coded shape signal which is the result of the coding is output.

At subsequent step 107, the pixel value signal B0 is coded referring to the pixel value signals P1 and P2. As shown in FIG. 9(a), the frame 901 is coded referring to the frames 900 and 903. Thereafter, at step 108, a coded pixel value signal is output as the result of the coding, and then the coding process for the pixel value signal of the frame is completed.

When the frame 901 of the pixel value signal and the corresponding shape signal 912 are subjected to the coding process, step 105 is executed according to the judgment of step 103. In this case, the shape signal 912 is coded referring to the shape signal 913.

In the procedure shown in the flow of FIG. 10, as shown in FIG. 9(b), the shape signals which are of the B frames are coded referring to either of the signals at a forward and backward positions on time series which is more temporarily close to the shape signal to be coded.

Figure 11:
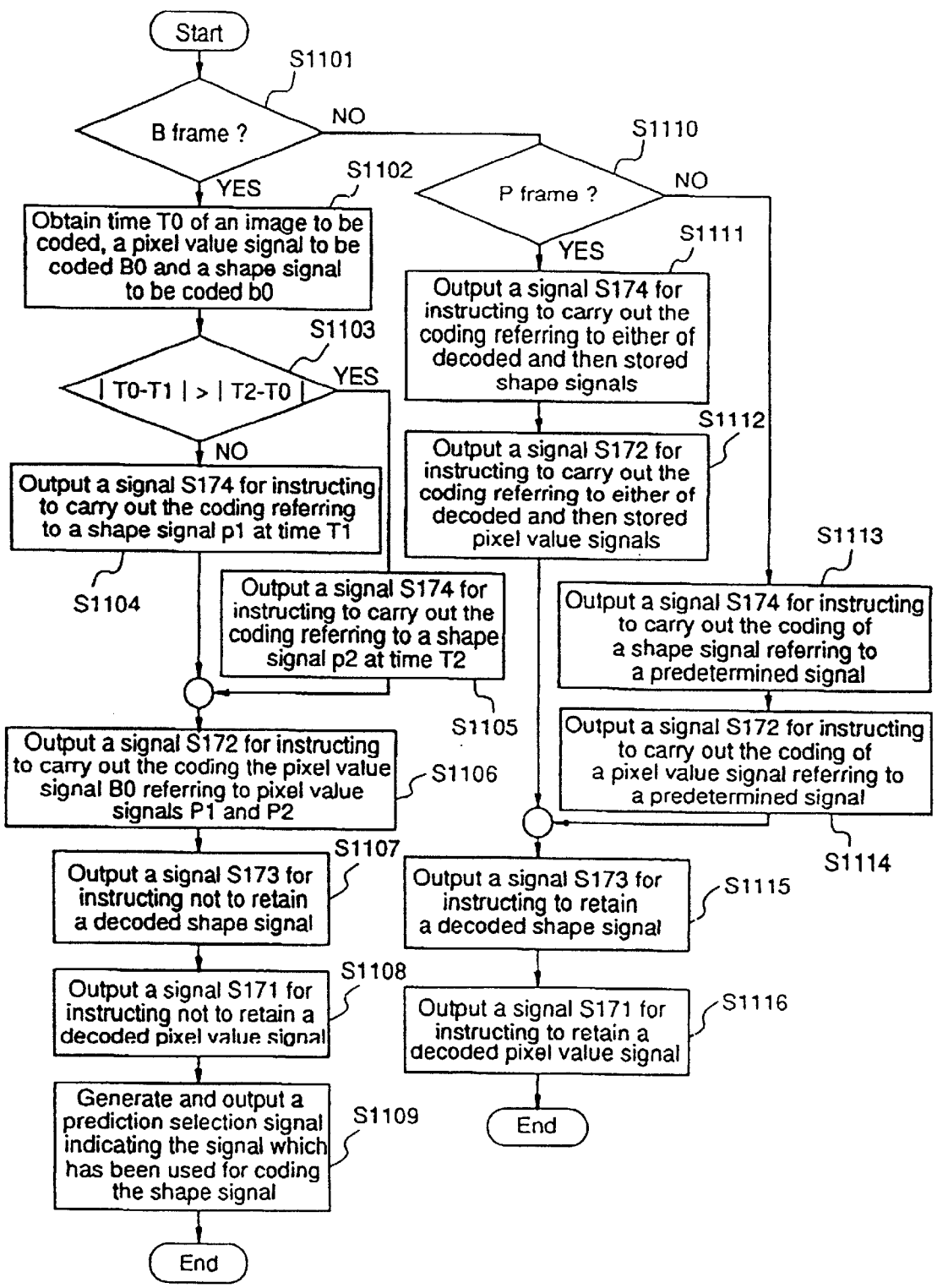
FIG. 11 is a flow chart showing the procedure of a coding control of a prediction change unit according to the thirteenth embodiment.

FIG. 11 is a flowchart of the coding process by the prediction changing unit 110 (FIG. 1) of the image coding apparatus according to the thirteenth embodiment. A description is given of the control in the thirteenth embodiment according to the flow of FIG. 11.

When a frame of pixel value signal and the corresponding shape signal are input, the procedure shown in FIG. 11 starts, and step 1101 judges whether the input image data to be coded is of the B frame or not. If the input image data is not of the B frame, the flow transits to the step 1110 where the image data is judged to be of the P frame or not.

When the image data is of the B frame, step 1102 and the following steps are executed. First at step 1102, the prediction changing unit 110 obtains time T0 of an image to be coded, and time T1 and time T2 of the pixel value signals P1 and P2 which are to be used as reference signals in the coding process of the pixel value signal constituting the image to be coded. Thereafter at step 1103, the absolute value of a difference between time T0 and time T1 and that between time T0 and time T2 are compared, and step 1104 and 1105 are executed according to the result of the comparison.

In FIG. 1, a decoded shape signal based on a shape signal at time T1 is retained in either of the memories 115 and 116, while a decoded shape signal based on a shape signal at time T2 is retained in the other memory. When step 1104 or step 1105 is executed, a decoded shape signal at time T1 or T2 of which time is closer in time to time T0 is selected to be used for coding a shape signal. This is carried out by the prediction changing unit 110 which outputs the reference shape changing signal S174 to the fourth switching circuit 114 to control it in a way that selects the first or second decoded and then stored shape signal as the reference shape signal S166.

Thereafter, at step 1106, the prediction changing unit 110 controls the selection of a reference signal used for coding a pixel value signal. A decoded pixel value signal at time T1 is retained in either of the memories 107 or 108 in FIG. 1, while a decoded pixel value signal at time T2 is retained in the other memory. Afterwards the average calculator 109 obtains an average decoded pixel value signal as an average of the first and second decoded and then stored pixel value signals. The prediction changing unit 110 outputs the reference changing signal S172 to the second switching circuit 106 to control it in such a way as that the average decoded pixel value signal S159 is output as the reference pixel value signal S155 from it.

As shown in FIG. 9, since a signal of the B frame is not referred, the prediction changing unit 110, at steps 1107 and 1108, controls not to retain a decoded signal based on the signal of the B frame in a memory. In FIG. 1, the decoded pixel value signal S156 based on the input pixel value signal S151 at time T0 is input to the first switching circuit 105, and the decoded shape signal S163 based on the input shape signal S161 at time T0 is input to the third switching circuit 113. The prediction changing unit 110 outputs the decoding pixel value changing signal S171 to the first switching circuit 105, and the decoding shape changing signal S173 to the second switching circuit 106, to control the first and second switching circuits in such a way as that both the decoded pixel value signal S156 and the decoded shape signal S163 are not input to a memory, but are abandoned.

Thereafter, step 1109 is executed. At step 1109, the prediction changing unit 110 outputs information on the reference coding for the shape signal as the prediction selection signal S175. That is, information indicating time P1 and time P2 are included in the prediction selection signal S175 without being coded, and the prediction selection S175 is output as the output of the image coding apparatus. When the result of the coding is to be decoded, the decoding is appropriately carried out using the information indicating the time.

As step 1102 to step 1109 are executed, the image coding process for the image data of the B frame is completed. Next, a description is given of a case where step 1102 to step 1109 are not executed because the image data to be coded is judged not to be of the B frame.

Step 1110 is executed after step 1101 when it is judged whether the input image data is of the P frame or not. When the image data is not of the P frame, the flow transits to step 1113 and the control of the processing for the I frame is executed.

When the image data is of the P frame, step 1111 to step 1112 are executed. At step 1111, the prediction changing unit 110 outputs the reference shape changing signal S174 to the fourth switching circuit 114 to instruct it to output either of the decoded and then stored shape signals in the memories 115 and 116 as the reference shape signal S166. The shape signal which is located at a forward position on time series from the shape signal to be coded is selected among the first and second decoded and then stored shape signals and output from the fourth switching circuit 114. At step 1112, the prediction changing unit 110 outputs the reference pixel value changing signal S172 to the second switching circuit 106 to instruct it in such a way as that either of the decoded pixel value signals retained in the memories 107 and 108 is output as the reference pixel value signal S155. The pixel value signal which is located at a forward position on time series from the pixel value signal to be coded is selected among the first and second decoded and then stored pixel value signals and output from the second switching circuit 106.

On the other hand, when the input image data is judged not to be of the P frame at step 1110, step 1113 to step 1114 are executed. At step 1113, the prediction changing unit 110 outputs the reference changing signal S174 to the fourth switching circuit 114 to instruct it to output a predetermined value as the reference shape signal S166. The predetermined value which is set as the fixed value for the intra-frame coding is selected and output from the fourth switching circuit 114. At step 1114, the prediction changing unit 110 outputs the reference pixel value signal S172 to the second switching circuit 106 to instruct it to output a predetermined value as the reference pixel value signal S155. The predetermined value which is set as the fixed value for the intra-frame coding is selected and output from the second switching circuit 106.

When either the steps 1111 to 1112 or the steps 1113 to 1114 are executed, step 1115 to step 1116 follow step 1112 or step 1114 are executed, and the control of the retaining a coded signal is carried out.

As shown in FIG. 9, as signals of the P frame and the I frame are to be referred, the prediction changing unit 110 controls a decoded signal based on the signals to be referred in such a way as that the decoded signal S156 based on the input pixel value signal S151 at time T0 is input to the first switching circuit 105, while the decoded shape signal S163 based on the input shape signal S161 at time T0 is input to the third switching circuit 113. The prediction changing unit 110 outputs the decoding pixel value changing signal S171 to the first switching circuit 105 and the decoding shape changing signal S173 to the third switching circuit 113 to control them in such a way as that the decoded pixel value signal S156 and the decoded shape signal S163 are to be input to the memory which does not receive a decoded signal previously. Each decoded signal is input and retained in the specified memory. When step 1115 to step 1116 are executed, the input image signal of the P frame or the I frame is completely processed if the decoded signal is stored in either of the memories.

As described above, the image coding apparatus according to the thirteenth embodiment has the configuration similar to that of the image coding apparatus according to the first embodiment, and the prediction changing unit 110 controls the coding processes of the input pixel value signal and the input shape signals in such a way as that the respective appropriate reference methods are carried out. Therefore, each input signal is efficiently coded similarly to the first embodiment, and the decoding process can be appropriately carried out using information on the reference process in the coding.

Embodiment 14

An image coding method and an image coding apparatus according to a fourteenth embodiment, similarly to the thirteenth embodiment, employ a different reference method for the coding of a shape signal from that for the coding of a pixel value signal, that is, a selection method for a reference signal is different from that in the thirteen embodiment.

The configuration of the image coding apparatus according to the fourteenth embodiment is similar to that in the first embodiment and therefore FIG. 1 is used for the explanation. A description is given of the operation of the image coding apparatus according to the fourteenth embodiment.

The image coding apparatus according to the fourteenth embodiment has the operation almost similar to that according to the thirteenth embodiment, but a reference method when an input image signal is of the B frame is different from that in the thirteenth embodiment.

In the thirteenth embodiment, as shown in FIG. 9(b), either a shape signal located at a forward position on time series or a shape signal located at a backward position on time series is selected as a reference signal for a shape signal corresponding to a pixel value signal of the B frame. For the selection, differences in time between a shape signal to be coded and the shape signals located at a forward and backward positions from the shape signal to be coded are compared, and the one which has the smaller difference in time is selected.

As opposed to this, in the fourteenth embodiment, the shape signal located at a forward position on time series is always used as the reference signal. Whereas in the thirteenth embodiment shown in FIG. 9(b), the shape signal 910 is referred for coding the shape signal 911, and the shape signal 913 is referred for coding the shape signal 912, in the fourteenth embodiment, the shape signal 910 is referred both for the coding of the shape signal 911 and for the coding of the shape signal 912. Accordingly, the comparison judgment of the differences in time, which is carried out in the thirteenth embodiment, in unnecessary, whereby the control becomes simple. Especially when the time intervals of the frames is constant, or nearly constant, the method is effective.

As described above, the image coding apparatus according to the fourteenth embodiment has the configuration similar to that of the image coding apparatus according to the first embodiment, and the prediction changing unit 110 controls the coding processes of the input pixel value signal and the input shape signals in such a way as that the respective appropriate reference methods are carried out. Therefore, each input signal is efficiently coded similarly to the first embodiment, and the decoding process can be appropriately carried out using information on the reference process in the coding.

Embodiment 15

An image coding method and an image coding apparatus according to a fifteenth embodiment, similarly to the thirteenth embodiment, employ a different reference method for the coding of a shape signal from that for the coding of a pixel value signal, that is, a selection method for a reference signal is different from that in the thirteen embodiment.

The configuration of the image coding apparatus according to the fifteenth embodiment is similar to that in the first embodiment and therefore FIG. 1 is used for the explanation. A description is given of the operation of the image coding apparatus according to the fifteenth embodiment.

The image coding apparatus according to the fifteenth embodiment has the operation almost similar to that according to the thirteenth embodiment, but a reference method when an input image signal is of the B frame is different from those in the thirteenth and fourteenth embodiments.

In the thirteenth embodiment, as shown in FIG. 9(b), either a shape signal at a forward position on time series or a shape signal at a backward position on time series is selected as a reference signal for a shape signal corresponding to a pixel value signal of the B frame. For the selection, differences in time between a shape signal to be coded and the shape signals at a forward and backward positions from the shape signal to be coded are compared, and the one which has the smaller difference in time is selected. Also, in the fourteenth embodiment, the shape signal at a forward position on time series is always used as a reference signal.

As opposed to this, in the fifteenth embodiment, in the coding of a shape signal, the prediction changing unit 110 (FIG. 1) decides whether the reference method is selected by the comparison judgment such as in the thirteenth embodiment, namely the comparison judgment selection, or a shape signal at a forward position on time series is referred, namely the forward fixed selection. The decision by the prediction changing unit 110 can be done according to the properties of the input pixel value signal or the status of the coding process or the like.

As described above, the image coding apparatus according to the fifteenth embodiment has the configuration similar to that of the image coding apparatus according to the first embodiment, and the prediction changing unit 110 controls the coding processes of the input pixel value signal and the input shape signals in such a way as that the respective appropriate reference methods are carried. Therefore, each input signal is, similarly to the first embodiment, efficiently coded out according to the properties of the input pixel value signal or the status of the coding process or the like, and the decoding process can be appropriately carried out using information on the reference process in the coding.

Embodiment 16

An image decoding method and an image decoding apparatus according to a sixteenth embodiment appropriately decode the result of the coding obtained by the image coding process according to the thirteenth embodiment.

The image decoding apparatus according to the sixteenth embodiment has the configuration similar to that according to the second embodiment and therefore FIG. 3 is used for the explanation. Also in the operation of the image decoding apparatus according to the sixteenth embodiment, the decoding processes for a pixel value signal and a shape signal are almost similar to those in the second embodiment, but a process when an input coded signal is obtained by coding an image signal of the B frame is different from the second embodiment.

Figure 12:
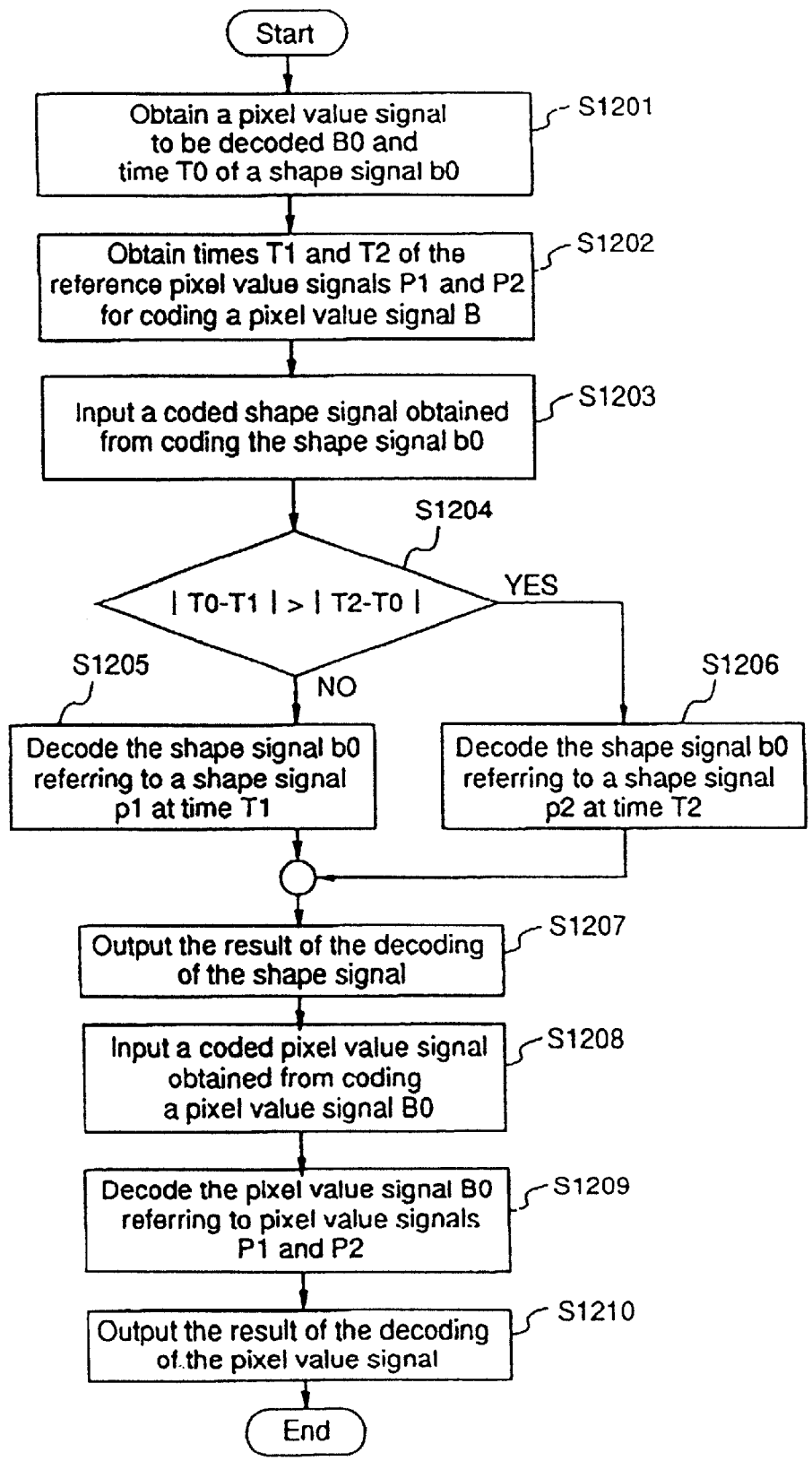
FIG. 12 is a flow chart showing the procedure of a decoding process for a B frame of an image decoding apparatus according to a sixteenth embodiment of the present invention.

FIG. 12 is a flowchart showing the procedure of the process for a coded signal obtained by coding an image signal of the B frame. A description is given of the operation of the image decoding apparatus according to the sixteenth embodiment referring to FIG. 3 and according to the flowchart of FIG. 12, as follows.

A coded pixel value signal, a coded shape signal and a prediction selection signal, which are output from the image coding apparatus according to the thirteenth embodiment, are input as a coded image signal including the input coded pixel value signal S353, the input coded shape signal S363 and the input prediction selection signal S375, and then the process starts. Initially, at step 1201, the prediction changing unit 370 obtains the time T0 of the input coded pixel value signal B0 and input coded shape signal b0 to be decoded. Thereafter, at step 1202, the prediction changing unit 370 obtains the times T1 and T2 of the input decoded pixel value signals P1 and P2 which are to be referred in a process for the input coded pixel value signal of the B frame. At step 1203, the input coded shape signal b0 is input to the decoder 312.

The prediction changing unit 370, at step 1204, carries out a judgment process using the time obtained from step 1201 to step 1202. In the judgment process, the absolute values of differences in time between time T0 and times T1 and T2 are obtained and compared, so that which is the smaller is judged. Thereafter, when the result of the judgment shows the absolute value of the difference in time between T0 and T1 is the smaller, step 1205 is executed, while when the absolute value of the difference in time between T0 and T2 is the smaller, step 1206 is executed.

When step 1205 is executed, the prediction changing unit 370 outputs the reference shape changing signal S374 to the fourth switching circuit 314 to instruct it to output a signal p1 at time T1 among decoded shape signals retained in the memories 315 and 316 as the reference shape signal S332. The decoder 312 receives the reference shape signal S332 from the fourth switching circuit 314, and decodes the input coded shape signal b0 input at step 1203 referring to the reference shape signal S332.

When step 1206 is executed, the almost similar process is carried out. The input coded shape signal b0 is decoded using a decoded shape signal p2 at time T2 as the reference shape signal S332.

When either step 1205 or step 1206 is executed, step 1207 is followed and executed, so that the decoded shape signal S331 obtained from the decoding process is output to the memory for rearrangement 362.

Thereafter, step 1208 is executed, so that the input pixel value signal B0 is input to the decoder 303. At the next step 1209, the prediction changing unit 370, based on information obtained from the input prediction selection signal S375, outputs the reference pixel value changing signal S372 to the second switching circuit 306 to control it in such a way as that either decoded pixel value signals at times T1 and T2 retained in the memories 307 and 308, or an average decoded pixel value signal which is the average of both the decoded pixel value signals retained in the memories 307 and 308 obtained by the average calculator 309, is used as the reference pixel value signal S323. Thereafter, in the decoder 303, the input pixel value signal B0 input at step 1208 is decoded referring to the reference pixel value signal S323. At step 1210, the decoded pixel value signal S322 which is generated is output to the memory for rearrangement 361, and then the process for the input coded pixel value signal is completed.

As described above, the image decoding apparatus according to the sixteenth embodiment has the configuration similar to that according to the second embodiment, and the prediction changing unit 370 controls the decoding process for a decoded shape signal in a way that uses an appropriate reference signal, whereby the result of the coding in the image coding apparatus according to the thirteenth embodiment can be appropriately decoded.

Embodiment 17

An image decoding method and an image decoding apparatus according to a seventeenth embodiment appropriately decode the result of the coding obtained by the image coding process according to the fourteenth embodiment.

The image decoding apparatus according to the seventeenth embodiment has the configuration similar to that according to the second embodiment and therefore FIG. 3 is used for the explanation. Also in the operation of the image decoding apparatus according to the seventeenth embodiment, the decoding processes for a pixel value signal and a shape signal are almost similar to those in the second embodiment, but a process when an input coded signal is obtained by coding an image signal of the B frame is different from the second embodiment.

In this case, the image decoding apparatus according to the seventeenth embodiment operates similarly to that according to the sixteenth embodiment, but a selection method for the reference signal used for decoding the input coded shape signal is different. In the image decoding apparatus according to the sixteenth embodiment, the comparison judgment is carried out for the selection so that a decoded shape signal having the smaller time interval is to be used. In the seventeenth embodiment, the comparison judgment is not carried out, but a decoded shape signal at a forward position on time series from the input coded signal to be decoded is used as the reference shape signal. Accordingly, the result of the coding output from the image coding apparatus according to the fourteenth embodiment where the similar reference process is carried out can be appropriately decoded.

As described above, the image decoding apparatus according to the seventeenth embodiment has the configuration similar to that according to the second embodiment, and the prediction changing unit 370 controls the decoding process for a decoded shape signal in a way that uses an appropriate reference signal, whereby the result of the coding in the image coding apparatus according to the fourteenth embodiment can be appropriately decoded.

Embodiment 18

An image decoding method and an image decoding apparatus according to an eighteenth embodiment appropriately decode the result of the coding obtained by the image coding process according to the fifteenth embodiment.

The image decoding apparatus according to the eighteenth embodiment has the configuration similar to that according to the second embodiment and therefore FIG. 3 is used for the explanation. Also in the operation of the image decoding apparatus according to the eighteenth embodiment, the decoding processes for a pixel value signal and a shape signal are almost similar to those in the second embodiment, but a process when an input coded signal is obtained by coding an image signal of the B frame is different from the second embodiment.

In this case, the image decoding apparatus according to the eighteenth embodiment operates similarly to those according to the sixteenth and seventeenth embodiments, but a selection method for the reference signal used for decoding the input coded shape signal is different. In the image decoding apparatus according to the sixteenth embodiment, the comparison judgment is carried out for the selection so that a decoded shape signal having the smaller time interval is to be used. In the seventh embodiment, the comparison judgment is not carried out, but a decoded shape signal at a forward position on time series from an input coded signal to be decoded is used as a reference shape signal.

As opposed to this, in the eighteenth embodiment, which the comparison judgment or the forward fixed selection has been carried out in the coding process is judged, and thereafter when the comparison judgment has been carried out, a decoding process similar to that in the sixteenth embodiment is carried out, while when the forward fixed selection has been carried out, a decoding process similar to that in the seventeenth embodiment is carried out. Whether the comparison judgment has been carried out or not is judged from information included in the prediction selection signal output by the image coding apparatus according to the fifteenth embodiment. Accordingly, the result of the coding output from the image coding apparatus according to the fifteenth embodiment where the similar reference process is carried out can be appropriately decoded.

As described above, the image decoding apparatus according to the eighteenth embodiment has the configuration similar to that according to the second embodiment, and the prediction changing unit 370 controls the decoding process for a decoded shape signal in a way that uses an appropriate reference signal, whereby the result of the coding in the image coding apparatus according to the fifteenth embodiment can be appropriately decoded.

Embodiment 19

An image coding program recording medium according to a nineteenth embodiment records an image coding program which carries out the image coding method of the present invention.

Figure 13:
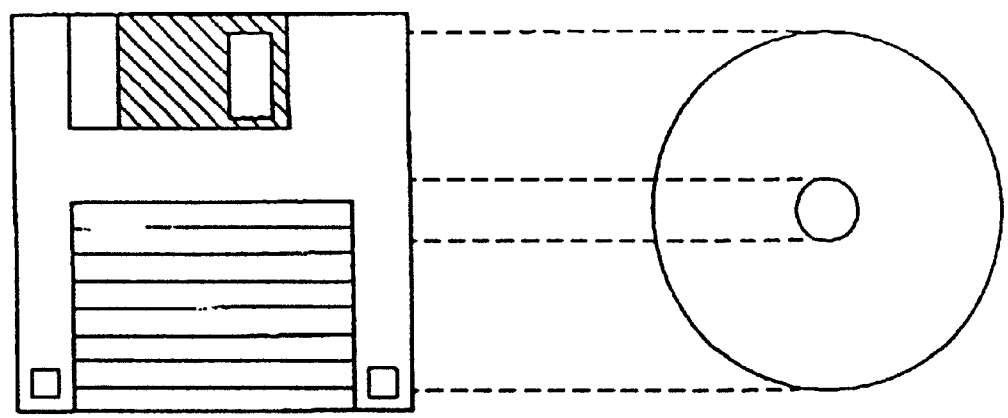
FIG. 13 is a diagram showing a floppy disk employed as an image coding program recording medium according to a nineteenth embodiment of the present invention and as an image decoding program recording medium according to a twentieth embodiment of the present invention.

FIG. 13 shows an example of a program recording medium, i.e., a floppy disk. The image coding program recording medium according to the nineteenth embodiment is such a recording medium in which an image coding program carrying out any of the image coding methods shown in the first, third to fifth, ninth to tenth, and thirteenth to fifteenth embodiments is recorded. Accordingly, the image coding program recording medium according to the nineteenth embodiment can be moved, preserved and so on. The recorded image coding program can be subjected to copying between the recording media and the like. The image coding apparatus shown in each embodiment can be realized by CPU and DSP and the like carrying out the program on a computer system and the like.

As an image coding program recording medium, other than the floppy disk shown in the figure, anything which can record a program, namely an optical disk such as a CD-ROM, a semiconductor storage such as an IC card, and a tape medium such as a cassette tape, can be usable.

As described above, the image coding program recording medium according to the nineteenth embodiment can realize the image coding method and image coding apparatus of the present invention by carrying out the recorded image coding program on a computer system and the like, and makes the image coding method of this invention used with ease.

Embodiment 20

An image decoding program recording medium according to a twentieth embodiment records an image decoding program which carries out the image decoding method of the present invention.

FIG. 13 shows an example of a program recording medium, i.e., a floppy disk. The image decoding program recording medium according to the twentieth embodiment is such a recording medium in which an image decoding program carrying out any of the image decoding methods shown in the second, sixth to eighth, eleventh to twelfth, and sixteenth to eighteenth embodiments is recorded. Accordingly, the image decoding program recording medium according to the twentieth embodiment can be moved, preserved and so on. The recorded image decoding program can be subjected to copying between the recording media and the like. The image decoding apparatus shown in each embodiment can be realized by CPU and DSP and the like carrying out the program on a computer system and the like.

As an image decoding program recording medium, other than the floppy disk shown in the figure, anything which can record a program, namely an optical disk such as a CD-ROM, a semiconductor storage such as an IC card, and a tape medium such as a cassette tape, can be usable.

As described above, the image decoding program recording medium according to the twentieth embodiment can realize the image decoding method and image decoding apparatus of the present invention by carrying out the recorded image decoding program on a computer system and the like, and makes the image decoding method of this invention used with ease.

Further, although an image signal includes a shape signal and a pixel value signal in the image coding processes and the image decoding processes described in the first to twentieth embodiments, the image coding methods and image coding apparatus of this invention are also applicable when semitransparent objects are dealt with and a shape signal is substituted for or combined with a transparency signal which has multivalued information indicating the degree of the occlusion of an object against a background. A case where an image signal includes a transparency signal in place of a shape signal is applicable to the present invention if the transparency signal replaces the shape signal in the present invention. Another case where an image signal includes a shape signal, a transparency signal and a pixel value signal is also applicable if the transparency signal and either the shape signal or the pixel value signal are dealt with together. By extending the application where a pixel value signal and a shape signal are separately dealt with, a transparency signal is also dealt with separately.

Still further, in the first to twentieth embodiments, assuming that a irreversible coding is employed in the coding of an image signal, a signal which is decoded after being coded is used as a reference signal. However, when a reversible coding is carried out, a pixel value signal and shape signal to be coded can be used as a reference signal. In this case, an input signal is used as a reference signal in the coding process and thus an encoder is dispensable.

What is claimed is:

1. An image decoding method which decodes a coded shape signal and a coded pixel value signal which are obtained by coding a shape signal which is included in an image signal and indicates a shape of an object and a pixel value signal which is included in said image signal and has information on a color and brightness of said object, comprising:

decoding said coded pixel value signal by referring to a decoded pixel value signal specified based on an information obtained from a prediction selection signal including information indicating a reference method in a coding process; and decoding said coded shape signal by referring to a decoded shape signal specified based on an information obtained from the prediction selection signal;

wherein in said decoding said coded shape signal, said method of referring to said decoded shape signal is specified as a method referring to a forward time decoded shape signal or a method referring to a backward time decoded shape signal, per each frame, and whether the decoded shape signal should be referred to or not is determined block by block.

2. An image decoding method which decodes a coded shape signal and a coded pixel value signal which are obtained by coding a shape signal which is included in an image signal and indicates a shape of an object and a pixel value signal which is included in said image signal and has information on a color and brightness of said object, comprising:

decoding said coded pixel value signal by referring to a decoded pixel value signal specified based on an information obtained from a prediction selection signal including information indicating a reference method in a coding process; and decoding said coded shape signal by referring to a decoded shape signal specified based on an information obtained from the prediction selection signal, wherein said shape signal decoding utilizes a frame constituting said coded shape signal; and wherein said shape signal decoding utilizes a hierarchical unit containing a large block unit constituting said shape signal and a small block unit constituting said large block unit.

* * * * *